United States Patent
Matsubara et al.

(10) Patent No.: US 7,922,617 B2
(45) Date of Patent: Apr. 12, 2011

(54) CONTROL DEVICE FOR VEHICULAR DRIVE SYSTEM

(75) Inventors: Tooru Matsubara, Toyota (JP); Atsushi Tabata, Okazaki (JP); Taku Akita, Kasugai (JP); Masakazu Kaifuku, Okazaki (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 641 days.

(21) Appl. No.: 11/987,635

(22) Filed: Dec. 3, 2007

(65) Prior Publication Data

US 2008/0153651 A1 Jun. 26, 2008

(30) Foreign Application Priority Data

Dec. 8, 2006 (JP) ................................. 2006-332633

(51) Int. Cl.
*B60K 1/02* (2006.01)
*B60W 10/04* (2006.01)

(52) U.S. Cl. .............................. 477/3; 477/115; 477/902

(58) Field of Classification Search .............. 477/3, 115, 477/125, 902; 475/5, 150, 153; 701/62
See application file for complete search history.

(56) References Cited

U.S. PATENT DOCUMENTS

| | | | | |
|---|---|---|---|---|
| 6,019,699 | A * | 2/2000 | Hoshiya et al. | 477/20 |
| 2005/0203678 | A1 | 9/2005 | Suzuki et al. | |
| 2006/0027413 | A1 * | 2/2006 | Tabata et al. | 180/305 |
| 2007/0105679 | A1 | 5/2007 | Tabata et al. | |
| 2007/0111854 | A1 | 5/2007 | Tabata et al. | |
| 2007/0155583 | A1 * | 7/2007 | Tabata et al. | 477/37 |
| 2008/0032855 | A1 * | 2/2008 | Sah et al. | 477/3 |
| 2009/0118955 | A1 * | 5/2009 | Tabata et al. | 701/66 |

FOREIGN PATENT DOCUMENTS

| | | |
|---|---|---|
| DE | 10 2005 010 883 A1 | 11/2005 |
| DE | 603 05 549 T2 | 11/2006 |
| EP | 1 346 865 B1 | 5/2006 |
| EP | 1 701 061 A1 | 9/2006 |
| JP | A 09-037410 | 2/1997 |
| JP | A 2002-243031 | 8/2002 |
| JP | B2 3526955 | 2/2004 |
| WO | WO 2006/137587 A1 | 12/2006 |

* cited by examiner

*Primary Examiner* — Roger Pang
(74) *Attorney, Agent, or Firm* — Oliff & Berridge, PLC

(57) ABSTRACT

The present invention relates to a control device for a vehicular drive system which properly controls a shift in a transmission portion upon receipt of a shift demand to the transmission portion for precluding a given element of the differential portion 11 from high rotation. For a shift demand to an automatic transmission (20), the transmission portion shift limiting means (86) determines a permissible range in terms of a speed ratio of an automatic transmission (20) in consideration of a rotational speed of a given element of a differential portion (11) for thereby limiting a shifting of the automatic transmission portion (20) based on the permissible range. Thus, when the shift demand to the automatic transmission (20) is present, the given element of the differential portion (11) can be avoided from high rotation. This enables the suppression of the high ration of, for instance, first and second electric motors (M1), (M2) and a first planetary gear (P1) or the like, improving durability of the first and second electric motors (M1), (M2) and the first planetary gear (P1) or the like.

16 Claims, 9 Drawing Sheets

|  | C1 | C2 | B1 | B2 | B3 | SPEED RATIO | STEPPING RATIO |
|---|---|---|---|---|---|---|---|
| 1st | O |  |  |  | O | 3.357 | 1.54 |
| 2nd | O |  |  | O |  | 2.180 | 1.53 |
| 3rd | O |  | O |  |  | 1.424 | 1.42 |
| 4th | O | O |  |  |  | 1.000 | SPREAD 3.36 |
| R |  | O |  |  | O | 3.209 |  |
| N |  |  |  |  |  |  |  |

O ENGAGED

CONTROL DEVICE FOR VEHICULAR DRIVE SYSTEM

BACKGROUND OF THE INVENTION

1. Field of the Invention

This invention relates to a control device for a vehicular drive system having an electric differential portion, incorporating a differential mechanism operative to perform a differential action, and a transmission portion disposed in a power transmitting path between the differential portion and drive wheels and, more particularly, to a technology of controlling a shifting action in the transmission portion in response to a shift demand for the shifting.

2. Description of the Related Art

A control device for a vehicular drive system has heretofore been well known as including a differential portion, having a differential mechanism operative to distribute an engine output to a first electric motor and a power transmitting member, and a transmission portion i.e., shifting portion disposed in a power transmitting path between the differential portion and drive wheels. The differential portion includes a first element, connected to the engine, a second element connected to the first element and the first electric motor, and a third element connected to the power transmitting member. With such a structure, the differential portion performs a differential action with a speed ratio being continuously varied to function as a continuously variable transmission.

Meanwhile, Patent Publication (Japanese Patent Application Publication No. 9-37410) discloses a technology related to a vehicular drive control device, having a continuously variable transmission, which varies a speed ratio of the continuously variable transmission with a variation in a vehicle speed. This allows an engine speed to be maintained at a fixed level regardless of the variation in vehicle speed, i.e., in other words, regardless of a variation in an output rotational speed of the continuously variable transmission. In addition, other technologies have heretofore been known as disclosed in Japanese Patent No. 3526955 and Japanese Patent Application Publication No. 2002-243031.

Even with a control device for a vehicular drive system having a differential portion and a transmission portion, the shifting is initiated in the differential portion in accordance with the shift in the transmission portion with a view to rendering the engine operative in an operating range with high efficiency. This makes it possible to maintain the engine speed at a nearly fixed level on a stage before and after the shifting regardless of a variation in output rotational speed of the differential portion due to the shift in the transmission portion.

However, during the operation of the control device for the vehicular drive system with such a structure mentioned above, the shifting is encountered with an issue. That is, depending on the relationship between the output rotational speed of the transmission portion and the engine speed, the first electric motor (second element) rotates at a speed, determined based on the relationship on mutual relative rotational speeds of the first to third elements of the differential portion, which results in a high rotation with a resultant drop in durability of these component parts. Besides, pinion gears, forming the differential mechanism, have rotation speeds (in another point of view, a difference between, for instance, a rotational speed of the engine (first element) and a rotational speed of the power transmitting member (third element)) falling in a high rotation range with a resultant drop in durability of the pinion gears (such as, for instance, pinion needle bearings and bushes, etc.). That is, depending on a shift demand for the automatic transmission portion, i.e., a speed ratio required for the transmission portion, there has been likely that the first electric motor rotates at a high speed and the pinion gears are caused to rotate at the high speed. No research and study work has heretofore been made in the related art with a view to addressing the occurrence of the high rotation of those component parts and the issues remained publicly unknown.

FIG. 12 is a well-known collinear chart representing rotational speeds of respective rotary elements forming the differential portion. The collinear chart shows examples of a variation in rotational speeds of the respective rotary elements with an up-shift executed in the transmission portion together with the relationship associated with the output rotational speed of the transmission portion. In FIG. 12, reference "ENG" represents the rotational speed of the first rotary element (first element) connected to the engine; "M1" the rotational speed of the second rotary element (second element) connected to the first electric motor; "M2" the rotational speed of the third rotary element (third element) connected to the power transmitting member and the second electric motor; and "OUTPUT" the output rotational speed of the transmission portion. In addition, respective straight lines, related to the differential portion, represent relative motion relationships in rotational speed among the respective rotary elements. Solid lines indicate the relative motion relationships prior to the execution of an up-shift action and broken lines indicate the relative motion relationships subsequent to the up-shift action.

As the up-shift executed with a decrease in the rotational speed "M2" as shown in FIG. 12, the rotational speed "M1" of the second element is raised so as to maintain the rotational speed "ENG" of the first element at a nearly fixed level. During such an up-shift, if the output rotational speed of the transmission portion remains in a relatively low state with the engine speed remained in a relatively high state, there has been likelihood of the first element having an increasing rotational speed so that the first electric motor rotates at a high speed. Besides, this results in a relatively increased difference in rotational speed between the engine speed and the power transmitting member (second electric motor), causing a probability to occur with the pinion gears, forming the differential portion, to rotate at high speeds.

Although the foregoing has been described with reference to the sup-shift operation of the transmission portion, it is needless to say that the pinion gears are liable to rotate at the high speed even when a downshift operation is effectuated in the transmission portion. In this case, the rotational speed of the first electric motor merely lays in a negative phase and, similarly, there has been likelihood of the first electric motor caused to rotate at a high speed. In addition, the foregoing has been exemplarily described with reference to the shifting initiated by the control device of the vehicular drive system in which a shifting control is performed to keep the engine speed at the nearly fixed level in accordance with the shifting in the transmission portion on a stage before and after the shifting. However, the particular arrangements described are meant to be illustrative only and the present issues are not limited to such a shifting control. It is of course to be appreciated that the present issues are encountered even when, for instance, the engine speed is varied on a stage before and after the shifting action.

SUMMARY OF THE INVENTION

The present invention has been completed with the above views in mind and has an object to provide a control device for a vehicular drive system that is operative to properly control a shifting in a transmission portion so as to suppress a given element of a differential portion from rotating at a high speed in the presence of a shift demand for the transmission portion.

To achieve such an object, the invention recited in claim 1 is featured by a control device for a vehicular drive system having a differential portion including a differential mechanism having a first element connected to an engine, a second element connected to a first electric motor and a third element connected to a power transmitting member for distributing an output of the engine to the first electric motor and the power transmitting member, and a transmission portion disposed in a power transmitting path between the power transmitting member and drive wheels, the control device characterized by transmission portion shift limiting means that, determining a permissible range of a speed ratio of the transmission portion for a shift demand to the transmission portion in consideration of a rotational speed of a given element of the differential portion, limits a shifting of the transmission portion based on the permissible range.

With such a structure, the transmission portion shift limiting means determines the permissible range of the speed ratio on the shift demanded to the transmission portion as the speed ratio for the transmission portion in consideration of the rotational speed of the given element of the differential portion for thereby limiting the shift in the transmission portion. Therefore, when the shift demand the transmission portion is present, the given element of the differential portion can be avoided from rotating at the high speed. This results in consequence of suppressing high rotations of, for instance, the first electric motor and the pinion gears forming the differential gear, resulting in improvements in durability of the first electric motor and the pinion gears.

The invention recited in claim 2 is featured by, in claim 1, that the transmission portion shift limiting means determines the permissible range so as to prevent a rotational speed of the given element from high rotation by referring to a relationship between an output rotational-speed relevant value of the transmission portion and an engine speed. With such a structure, the transmission portion shift limiting means more properly limits the shift in the transmission portion.

The invention recited in claim 3 is featured by, in claim 1 or 2, that the transmission portion shift limiting means determines the permissible range so as to prevent a relative rotation speed between the given elements from high rotation by referring to a relationship between an output rotational-speed relevant value of the transmission portion and an engine speed. With such a structure, the transmission portion shift limiting means more properly limits the shift in the transmission portion.

The invention recited in claim 4 is featured by, in one of claims 1 to 3, further comprising a second electric motor connected to the power transmitting member; wherein the transmission portion shift limiting means determines the permissible range so as to prevent a high rotation in a relative rotation speed between an element connected to the second electric motor, and an element held in engagement with the connected element. With such a structure, the transmission portion shift limiting means more properly limits the shift in the transmission portion.

The invention recited in claim 5 is featured by, in one of claims 1 to 4, that the transmission portion shift limiting means limits the shifting of the transmission portion by inhibiting the shift demanded to the transmission portion. With such a structure, upon receipt of the shift demand to the transmission portion, the given element of the differential portion can be properly avoided from high rotation.

The invention recited in claim 6 is featured by, in one of claims 1 to 4, that the transmission portion shift limiting means limits the shifting of the transmission portion by delaying the shift demanded to the transmission portion. With such a structure, upon receipt of the shift demand to the transmission portion, the given element of the differential portion can be properly avoided from high rotation.

The invention recited in claim 7 is featured by, in one of claims 1 to 4, that the transmission portion shift limiting means limits the shifting of the transmission portion by effectuating a shift different from the shift demanded to the transmission portion. With such a structure, upon receipt of the shift demand to the transmission portion, the given element of the differential portion can be properly avoided from high rotation.

The invention recited in claim 8 is featured by, in one of claims 1 to 4, that the transmission portion shift limiting means limits the shifting of the transmission portion by forcibly effectuating a shift from a current state of the transmission portion. With such a structure, upon receipt of the shift demand to the transmission portion, the given element of the differential portion can be properly avoided from high rotation.

The invention recited in claim 9 is featured by, in one of claims 1 to 8, that the transmission portion shift limiting means determines i.e., judges the permissible range based on the output rotational-speed relevant value of the transmission portion and an actual engine speed. With such a structure, the operation is executed to properly determine whether or not upper and lower limit speed ratios are selectable as the speed ratio i.e., gear ratio of the transmission portion.

The invention recited in claim 10 is featured by, in one of claims 1 to 8, that the transmission portion shift limiting means determines i.e., judges the permissible range based on the output rotational-speed relevant value of the transmission portion and a target engine speed. With such a structure, the operation is executed to properly determine whether or not upper and lower limit speed ratios are selectable as the speed ratio of the transmission portion.

The invention recited in claim 11 is featured by, in one of claims 1 to 10, that a normal shift in the transmission portion, when no shift of the transmission portion is limited by the transmission portion shift limiting means, is determined based on the output rotational-speed relevant value of the transmission portion and a driver's request. With such a structure, if no shift in the transmission portion is limited, an appropriate shift demand for the transmission portion is determined.

The invention recited in claim 12 is featured by, in one of claims 1 to 11, that the differential portion is operative as a continuously variable transmission with an operational state of the first electric motor being controlled. With such a structure, a continuously variable transmission can be structured of the differential portion and the transmission portion, making it possible to smoothly vary drive torque. In addition, the differential portion is operative as an electrically controlled continuously variable transmission with the speed ratio being continuously varied while, additionally, operating as a step-variable transmission with the speed ratio being varied stepwise.

More preferably, the differential mechanism includes a planetary gear set comprised of a first element connected to the engine, a second element connected to the first electric motor, and a third element connected to the power transmitting member. The first element includes a carrier of the planetary gear set; the second element includes a sun gear of the planetary gear set; and the third element includes a ring gear of the planetary gear set. With such a structure, the differential mechanism has a minimized axial direction. In addition, the differential mechanism can be simply structured with a single planetary gear set.

More preferably, the planetary gear set includes a single pinion type planetary gear set. With such a structure, the differential mechanism has a minimized axial direction. In addition, the differential mechanism can be simply structured with the single pinion type planetary gear set.

More preferably, the vehicular drive system establishes a total speed ratio based on the speed ratio (gear ratio) of the transmission portion and the speed ratio of the differential portion. With such a structure, utilizing the speed ratio of the transmission portion enables a vehicle drive force to be obtained in a wide range.

More preferably, the transmission portion includes an automatic transmission. With such a structure, the continuously variable transmission is comprised of, for instance, the differential portion, rendered operative as an electrically controlled continuously variable transmission, and a step-variable transmission, making it possible to smoothly vary drive torque. Under a circumstance where the differential portion is controlled to keep the speed ratio at a nearly fixed level, the differential portion and the step-variable transmission provide a status as that equivalent to the step-variable transmission. This results in capability of causing the vehicular drive system to vary the total speed ratio step-by-step for thereby obtaining immediate drive torque.

More preferably, as used herein, the term "output rotational-speed relevant value of the transmission portion" refers to a relevant value (equivalent value), corresponding to the output rotational speed of the transmission portion laying at a speed ratio of 1:1. Of course, the output rotational speed of the transmission portion is involved as the output rotational-speed relevant value, which additionally involves a rotational speed of, for instance, a vehicle axle, a rotational speed of a propeller shaft, an output rotational speed of a differential gear unit, and a vehicle speed representing a speed of a vehicle, etc.

More preferably, the transmission portion performs on the control on the demanded shift by: (1) inhibiting the demanded shifting; (2) delaying the demanded shifting; (3) performing a different shift; and (4) forcibly performing a shift from a current gear position.

DETAILED DESCRIPTION OF THE PREFERRED EMBODIMENTS

Now, various embodiments according to the present invention, will be described below in detail with reference to the accompanying drawings.

Embodiment

Figures 1, 2:
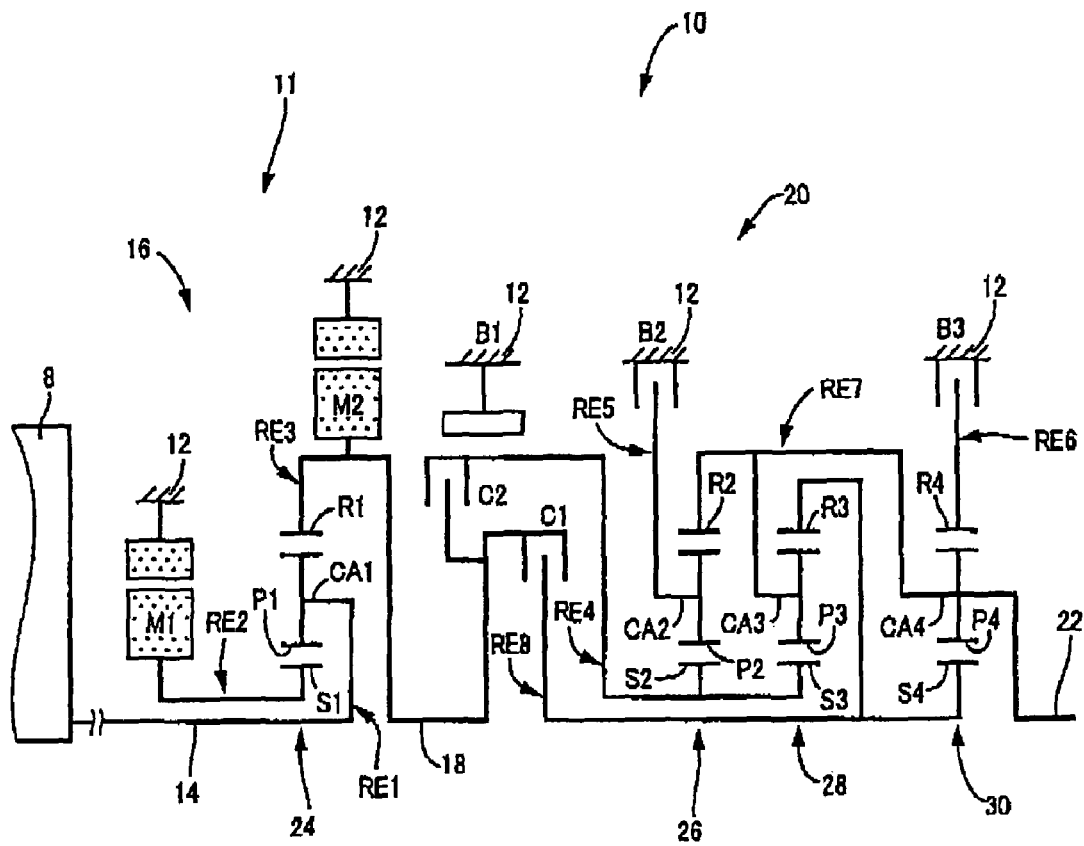
FIG. 1 is a skeleton diagram showing structure of a vehicular drive system of one embodiment according to the present invention for use in a hybrid vehicle.
FIG. 2 is a functional diagram illustrating combined operations of hydraulically operated frictional coupling devices for use in the vehicular drive system shown in FIG. 1.

FIG. 1 is a skeleton diagram for illustrating a transmission mechanism i.e., shifting mechanism 10 constituting a part of a drive system for a hybrid vehicle to which the present invention is applied. As shown in FIG. 1, the transmission mechanism 10 includes a transmission case 12 (hereinafter referred to as "a case 12") mounted on a vehicle body as a non-rotary member, an input shaft 14 disposed inside the case 12 as an input rotary member, a differential portion 11 coaxially connected to the input shaft 14 either directly, or indirectly via a pulsation absorbing damper (vibration damping device), not shown, and serving as a continuously variable transmission portion, an automatic transmission portion 20 connected in series in a power transmitting path between the differential portion 11 and drive wheels 34 (see FIG. 7) through a power transmitting member 18 (power transmitting shaft), and an output shaft 22 connected to the automatic transmission portion 20 and serving as an output rotary member.

The transmission mechanism 10 is suitably applied to an FR (front-engine and reverse-drive) type vehicle and mounted on a vehicle along a fore and aft direction thereof. The transmission mechanism 10 is disposed between an engine 8 and a pair of drive wheels 34. The engine 8 includes an internal combustion engine such as a gasoline engine or a diesel engine or the like and serves as a drive-power source. The engine 8 is directly connected to the input shaft 12 in series or indirectly through the pulsation absorbing damper (vibration damping device), not shown. This allows a vehicle drive force to be transferred from the engine 8 to the pair of drive wheels 34 in sequence through a differential gear device 32 (final speed reduction gear) (see FIG. 7) and a pair of drive axles.

With the transmission mechanism 10 of the illustrated embodiment, the engine 8 and the differential portion 11 are directly connected to each other. As used herein, the term "directly connected to each other" refers to a structure under which a direct connection is established between the associated component parts in the absence of a fluid-operated power transmitting device, such as a torque converter or a fluid coupling device or the like, and a connection including, for instance, the pulsation absorbing damper is involved in such a direction connection. It is noted that a lower half of the transmission mechanism 10, which is constructed symmetrically with respect to its axis, is omitted in FIG. 1. This is also true for the other embodiments of the invention described below.

The differential portion 11 includes a first electric motor M1, a power distributing mechanism 16, structured in a mechanical mechanism for mechanically distributing an output of the engine 8 applied to the input shaft 14, which functions as a differential mechanism through which the engine output is distributed to the first electric motor M1 and the power transmitting member 18, and a second electric motor M2 operatively connected to the power transmitting member 18 to be unitarily rotate therewith. In the illustrated embodiment, both the first and second electric motors M1 and M2 are so-called motor/generators each having a function to generate electric power. The first electric motor M1 has at least a function as an electric power generator for generating a reaction force. The second electric motor M2 has at least a function as a motor (electric motor) serving as a running drive power source to output a vehicle drive force.

The power distributing mechanism 16 includes, as a major component, a first planetary gear set 24 of a single pinion type having a gear ratio ρ1 of about 0.418, for example. The first planetary gear set 24 has rotary elements (elements) composed of a first sun gear S1, a first planetary gear P1, a first carrier CA1 supporting the first planetary gear P1 such that the first planetary gear P1 is rotatable about its axis and about the axis of the first sun gear S1, and a first ring gear R1 meshing with the first sun gear S1 through the first planetary gear P1. Where the numbers of teeth of the first sun gear S1 and the first ring gear R1 are represented by ZS1 and ZR1, respectively, the above gear ratio ρ1 is represented by ZS1/ZR1.

With the power distributing mechanism 16, a first carrier CA1 is connected to the input shaft 14, i.e., the engine 8; a first sun gear S1 is connected to the first electric motor M1; and a first ring gear R1 is connected to the power transmitting member 18. With the power distributing mechanism 16 of such a structure, the three elements of the first planetary gear set 24, i.e., the first sun gear S1, the first planetary gear P1, the first carrier CA1 and the first ring gear R1 are arranged to rotate relative to each other for initiating a differential action, i.e., in a differential state under which the differential action is initiated. This allows the engine output to be distributed to the first electric motor M1 and the power transmitting mechanism 18. Then, a part of the distributed engine output drives the first electric motor M1 to generate electric energy, which is stored and used for rotatably driving the second electric motor M2.

Thus, the differential portion 11 (power distributing mechanism 16) is caused to function as an electric differential device such that, for instance, the differential portion 11 is placed in a so-called continuously variable shifting state (electrically established CVT state) to continuously vary the rotation of the power transmitting member 18 regardless of the engine 8 operating at a given rotational speed. That is, the differential portion 11 functions as an electrically controlled continuously variable transmission to provide a speed ratio γ0 (rotational speed $N_{IN}$ of the input shaft 14/rotational speed $N_{18}$ of the power transmitting member 18) that is continuously variable from a minimum value γ0min to a maximum value γ0max.

The automatic transmission portion 20 includes a single-pinion type second planetary gear set 26, a single-pinion type third planetary gear set 28 and a single-pinion type fourth planetary gear set 30. The automatic transmission portion 20 is a planetary gear type multiple-step transmission operable as a step-variable automatic transmission. The second planetary gear set 26 has: a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. For example, the second planetary gear set 26 has a given gear ratio ρ2 of about "0.562". The third planetary gear set 28 has: a third sun gear S3; a third planetary gear P3; a third carrier CA3 supporting the third planetary gear P3 such that the third planetary gear P3 is rotatable about its axis and about the axis of the third sun gear S3; and a third ring gear R3 meshing with the third sun gear S3 through the third planetary gear P3. For example, the third planetary gear set 28 has a given gear ratio ρ3 of about "0.425".

The fourth planetary gear set 30 has: a fourth sun gear S4; a fourth planetary gear P4; a fourth carrier CA4 supporting the fourth planetary gear P4 such that the fourth planetary gear P4 is rotatable about its axis and about the axis of the fourth sun gear S4; and a fourth ring gear R4 meshing with the fourth sun gear S4 through the fourth planetary gear P4. For example, the fourth planetary gear set 30 has a given gear ratio ρ4 of, for instance, about "0.421". With the second sun gear S2, second ring gear R2, third sun gear S3, third ring gear R3, fourth sun gear S4 and four ring gear R4 having the numbers of gear teeth represented by ZS2, ZR2, ZS3, ZR3, ZS4 and ZR4, respectively, the gear ratios ρ2, ρ3 and ρ4 are expressed by ZS2/ZR2, ZS3/ZR3, and ZS4/ZR4, respectively.

In the automatic transmission portion 20, the second and third sun gears S2, S3 are integrally connected to each other, selectively connected to the power transmitting member 18 through a second clutch C2, and selectively connected to the casing 12 through a first brake B1. The second carrier CA2 is selectively connected to the casing 12 through a second brake B2, and the fourth ring gear R4 is selectively connected to the casing 12 through a third brake B3. The second ring gear R2, third carrier CA3 and fourth carrier CA4 are integrally connected to each other and connected to the output shaft 22. The third ring gear R3 and the fourth sun gear S4 are integrally connected to each other and selectively connected to the power transmitting member 18 through a first clutch C1.

Thus, the automatic transmission portion 20 and the differential portion 11 (power transmitting member 18) are selectively connected to each other through the first clutch C1 or the second clutch C2, which is provided to establish each gear position (shift gear position) in the automatic transmission portion 20. In other words, the first and second clutches C1, C2 function as coupling devices i.e., engaging device operable to place the power transmitting path between the power transmitting member 18 and the automatic transmission portion 20, that is, the power transmitting path between the differential portion 11 (power transmitting member 18) and the drive wheels 34, selectively in one of a power transmitting state in which the vehicle drive force can be transmitted through the power transmitting path, and the power out-off state in which the vehicle drive force cannot be transmitted through the power transmitting path. That is, with at least one of the first and second clutches C1 and C2 brought into coupling engagement, the power transmitting path is placed in the power transmitting state. In contrast, uncoupling both the first and second clutches C1 and C2 places the power transmitting path in the power cut-off state.

With the automatic transmission portion 20, further, uncoupling an on-uncoupling coupling device while coupling an on-coupling coupling device allows a so-called "clutch-to-clutch" shifting action to be executed for respective gear positions to be selectively established. This allows a speed ratio $\gamma$ (rotational speed $N_{18}$ of the power transmitting member 18/rotational speed $N_{OUT}$ of the output shaft 22) to be obtained in equally varying ratio for each gear position. As indicated in the coupling operation table shown in FIG. 2, coupling the first clutch C1 and third brake B3 establishes 1st-speed gear position having a speed ratio $\gamma 1$ of approximately, for instance, "3.357".

With the first clutch C1 and second brake B3 coupled in operation, a 2nd-speed gear position is established with a speed ratio $\gamma 2$ of, for instance, approximately "2.180", which is lower a value of the speed ratio $\gamma 1$. With the first clutch C1 and first brake B1 coupled in operation, a 3rd-speed gear position is established with a speed ratio $\gamma 3$ of, for instance, approximately "1.424", which is lower a value of the speed ratio $\gamma 2$. Coupling the first clutch C1 and second clutch C2 establishes a 4th-speed gear position with a speed ratio $\gamma 4$ of, for instance, approximately "1.000", which is lower than the speed ratio $\gamma 3$. Coupling the second clutch C2 and third brake B3 establishes a reverse-drive gear position (reverse-drive shift position) with a speed ratio $\gamma R$ of, for instance, approximately 3.209, which is intermediate between those of the 1st-speed gear position and the 2nd-speed gear position. In addition, uncoupling i.e., disengaging or releasing the first clutch C1, second clutch C2, first brake B1, second brake B2 and third brake B3 allows a neutral position N to be established.

The first clutch C1, second clutch C2, first brake D1, second brake B2 and third brake B3 (hereinafter collectively referred to as clutch C and brake B, unless otherwise specified) are hydraulically operated frictional coupling devices that are used in the related art vehicular automatic transmission. Each of these frictional coupling devices may include a wet-type multiple-disc clutch, having a plurality of mutually overlapping friction plates adapted to be pressurized against each other by a hydraulic actuator, or a band brake including a rotary drum having an outer circumferential surface on which one band or two bands are wound with terminal ends being adapted to be tightened by a hydraulic actuator. Thus, the frictional coupling device serves to selectively provide a drive connection between two component parts between which each clutch or brake is interposed.

With the transmission mechanism 10 of such a structure, the differential portion 11, serving as the continuously variable transmission, and the automatic transmission portion 20 constitute a continuously variable transmission. Further, with the differential portion 11 controlled so as to provide a speed ratio kept at a fixed level, the differential portion 11 and the automatic transmission portion 20 can provide the same state as that of a step-variable transmission.

More particularly, the differential portion 11 functions as the continuously variable transmission and the automatic transmission portion 20, connected to the differential portion 11 in series, functions as the step-variable transmission. Thus, the rotational speed, input to the automatic transmission portion 20 placed for at least one gear position M, (hereinafter referred to as "input rotational speed of the automatic transmission portion 20"), i.e., the rotational speed of the power transmitting member 18 (hereinafter referred to as "transmitting-member rotational speed $N_{18}$") are caused to continuously vary, thereby enabling the gear position M to have a continuously variable speed range. Accordingly, the transmission mechanism 10 provides an overall speed ratio $\gamma T$ (rotational speed $N_{IN}$ of the input shaft 14/rotational speed $N_{OUT}$ of the output shaft 22) in a continuously variable range. Thus, the continuously variable transmission is established in the transmission mechanism 10. The overall speed ratio $\gamma T$ of the transmission mechanism 10 is the total speed ratio $\gamma T$ of a whole of the automatic transmission portion 20 that is established based on the speed ratio $\gamma 0$ of the differential portion 11 and the speed ratio $\gamma$ of the automatic transmission portion 20.

For the respective gear positions such as, for instance, the 1st-speed to 4th-speed gear positions of the automatic transmission portion 20 and the reverse-drive gear position as indicated in the coupling operation table shown in FIG. 2, the transmitting-member rotational speed $N_{18}$ continuously varied with each gear position being obtained in a continuously variable speed range. Accordingly, a continuously variable speed ratio is present between adjacent gear positions, enabling the whole of the transmission mechanism 10 to have the total speed ratio $\gamma T$ in a continuously variable range.

Further, the speed ratio $\gamma 0$ of the differential portion 11 is controlled so as to lay at a fixed level and the clutch C and brake B are selectively coupled, thereby causing either one of the 1st-speed to 4th-speed gear positions or the reverse-drive gear position (reverse-drive shift position) to be selectively established. This allows the overall speed ratio $\gamma T$, variable in a nearly equal ratio, of the transmission mechanism 10 to be obtained for each gear position. Thus, the transmission mechanism 10 can be established in the same state as that of the step-variable transmission.

If, for instance, the differential portion 11 is controlled so as to provide the speed ratio $\gamma 0$ at a fixed value of "1", the transmission mechanism 10 provides the total speed ratio $\gamma T$ for each gear position of the 1st-speed to 4th-speed gear positions of the automatic transmission portion 20 and the reverse-drive gear position as indicated by the coupling operation table shown in FIG. 2. Further, if the automatic transmission portion 20 is controlled under the 4th-speed gear position so as to cause the differential portion 11 to have the speed ratio $\gamma 0$ of approximately, for instance, "0.7" less than a value of "1", the automatic transmission portion 20 has the total speed ratio $\gamma T$ of approximately, for instance, "0.7" that is less than a value of the 4th-speed gear position.

Figure 3:
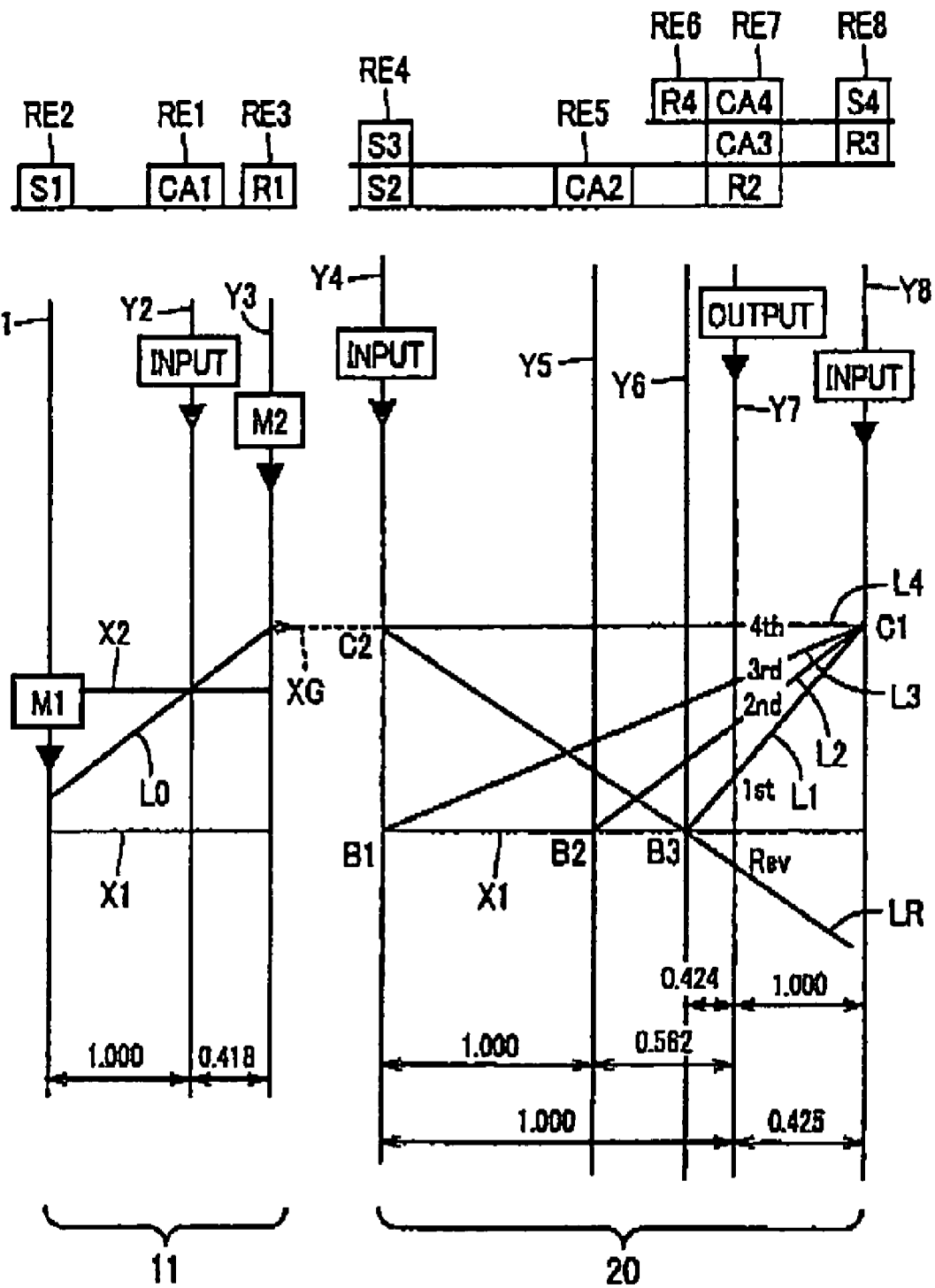
FIG. 3 is a collinear chart indicating mutually relative rotating speeds of rotary elements establishing various gear positions in the vehicular drive system shown in FIG. 1.

FIG. 3 is a collinear chart for the transmission mechanism 10, including the differential portion 11 and the automatic transmission portion 20, wherein the relative motion relationships among the rotational speeds of the various rotary elements in different coupling states for each gear position can be plotted on straight lines. The collinear chart of FIG. 3 takes the form of a two-dimensional coordinate system having the abscissa axis plotted with the gear ratios $\rho$ of the planetary gear sets 24, 26, 28, 30 and the ordinate axis plotted with the mutually relative rotating speeds of the rotary elements. A transverse line X1 indicates the rotational speed that is zeroed; a transverse line X2 the rotational speed of "1.0", that is, the rotating speed $N_E$ of the engine 8 connected to the input shaft 14; and a transverse line XG the rotational speed of the power transmitting member 18.

Starting from the left, three vertical lines Y1, Y2 and Y3, associated with the three elements of the power distributing mechanism 16 forming the differential portion 11, represent the mutually relative rotating speeds of the first sun gear S1 corresponding to a second rotary element (second element) RE2, the first carrier CA1 corresponding to a first rotary element (first element) RE1, and the first ring gear R1 corresponding to a third rotary element (third element) RE3, respectively. A distance between the adjacent vertical lines is determined based on the gear ratio ρ1 of the first planetary gear set 24.

Starting from the left, further, five vertical lines Y4, Y5, Y6, Y7 and Y8 for the automatic transmission portion 20 represent the mutually relative rotating speeds of: the second and third sun gears S2, S3, connected to each other, which corresponds to a fourth rotary element (fourth element) RE4; the second carrier CA2 corresponding to a fifth rotary element (fifth element) RE5; the fourth ring gear R4a corresponding to a sixth rotary element (sixth element) RE6; the second ring gear R2, third carriers CA3 and fourth carriers CA4, connected to each other, which correspond to a seventh rotary element (seventh element) RE7; and the third ring gear R3 and fourth sun gear S4 connected to each other and corresponding to an eighth rotary element (eighth element) RE5, respectively. Each distance between the adjacent vertical lines is determined based on the gear ratios ρ2, ρ3 and ρ4 of the second, third and fourth planetary gear sets 26, 28, 30.

In the relationship among the vertical lines on the collinear chart, if a space between the sun gear and carrier is set to a distance corresponding to a value of "1", then, a space between the carrier and ring gear lies at a distance corresponding to the gear ratio ρ of the planetary gear set. That is, for the differential portion 11, a space between the vertical lines Y1 and Y2 is set to a distance corresponding to a value of "1" and a space between the vertical lines Y2 and Y3 is set to a distance corresponding to the gear ratio ρ1. For the automatic transmission portion 20, further, the space between the sun gear and carrier is set to the distance corresponding to the value of "1" for each of the second, third and fourth planetary gear sets 26, 28, 30, for which the space between the carrier and ring gear is set to the distance corresponding to the gear ratio ρ1.

Referring to the collinear chart of FIG. 3, the power distributing mechanism 16 (differential portion 11) of the transmission mechanism 10 is arranged such that the first rotary element RE1 (first carrier CA1) of the first planetary gear set 24 is connected to the input shaft 14, i.e., the engine 8 and the second rotary element RE2 is connected to the first electric motor M1. The third rotary element RE3 (first ring gear R1) is connected to the power transmitting member 18 and the second electric motor M2. Thus, a rotary motion of the input shaft 14 is transmitted (input) to the automatic transmission portion 20 through the power transmitting member 18. A relationship between the rotational speeds of the first sun gear S1 and the first ring gear R1 is represented by an inclined straight line L0 which passes across a point of intersection between the lines Y2 and X2.

Now, description is made of a case in which, for example, the differential portion 11 is placed in a differential state with the first to third rotary elements RE1 to RE3 enabled to rotate relative to each other while the rotational speed of the first ring gear R1, indicated at an intersecting point between the straight line L0 and the vertical line Y1, is bound with the vehicle speed V and remains at a nearly constant level. In this case, as the engine speed $N_E$ is controlled with the rotational speed of the first carrier CA1, as represented by an intersecting point between the straight line L0 and the vertical line Y2, being raised or lowered, the rotational speed of the first sun gear S1, i.e., the rotational speed of the first electric motor M1, indicated by an intersecting pint between the straight line L0 and the vertical line Y1, is raised or lowered.

On controlling the rotational speed of the first electric motor M1 so as to allow the differential portion 11 to have the speed ratio γ0 of "1" with the first sun gear S1 rotating at the same speed as the engine speed $N_E$, the straight line L0 is aligned with the horizontal line X2. When this takes place, the first ring gear R1, i.e., the power transmitting member 18, is caused to rotate at the same speed as the engine speed $N_E$. On the contrary, if the rotational speed of the first electric motor M1 is controlled so as to allow the differential portion 11 to have the speed ratio γ0 of a value less than "1", for instance, a value of approximately "0.7" with the rotational speed of the first sun gear S1 being zeroed, the power transmitting member 18 is caused to rotate at an increased transmitting-member rotational speed $N_{18}$ higher than the engine speed $N_E$.

With the automatic transmission portion 20, the fourth rotary element RE4 is selectively connected to the power transmitting member 18 via the second clutch C2 and selectively connected to the casing 12 via the first brake B1 with the fifth rotary element RE5 being selectively connected to the casing 12 via the second brake B2. The sixth rotary element RE6 is selectively connected to the casing 12 via the third brake B3 with the seventh rotary element RE7 connected to the output shaft 22, and the eighth rotary element RE8 is selectively connected to the power transmitting member 18 via the first clutch C1.

Next, description is made of a case wherein with the automatic transmission portion 20, the differential portion 11 is placed in a state with the straight line L0 brought into coincidence with the horizontal line X2 to cause the differential portion 11 to transfer the vehicle drive force to the eighth rotary element RE8 at the same speed as the engine speed $N_E$ upon which the first clutch C1 and the third brake B3 are coupled as shown in FIG. 3. In this case, the rotational speed of the output shaft 22 for the 1st-speed gear position is represented by an intersecting point between the inclined line L1, passing across an intersecting point between the vertical line Y8, indicative of the rotational speed of the eighth rotary element RE8, and the horizontal line X2 and a point of intersection between the vertical line Y6, indicative of the rotational speed of the sixth rotary element RE6, and the horizontal line X1, and an intersecting point intersecting the vertical line Y7 indicative of the rotational speed of the seventh rotary element RE connected to the output shaft 22 as indicated in FIG. 3.

Similarly, the rotational speed of the output shaft 22 for the 2nd-speed gear position is represented by an intersecting point between an inclined straight line L2, determined when the first clutch C1 and second brake B2 are coupled, and the vertical line Y7 indicative of the rotational speed of the seventh rotary element RE7 connected to the output shaft 22. The rotational speed of the output shaft 22 for the 3rd-speed gear position is represented by an intersecting point between an inclined straight line L3, determined with the first clutch C1 and first brake B1 being coupled, and the vertical line Y7 indicative of the rotational speed of the seventh rotary element RE7 connected to the output shaft 22. The rotational speed of the output shaft 22 for the 4th-speed gear position is represented by an intersecting point between a horizontal straight line L4, determined with the first clutch C1 and second brake B2 being coupled, and the vertical line Y7 indicative of the rotational speed of the seventh rotary element RE7 connected to the output shaft 22.

Figure 4:
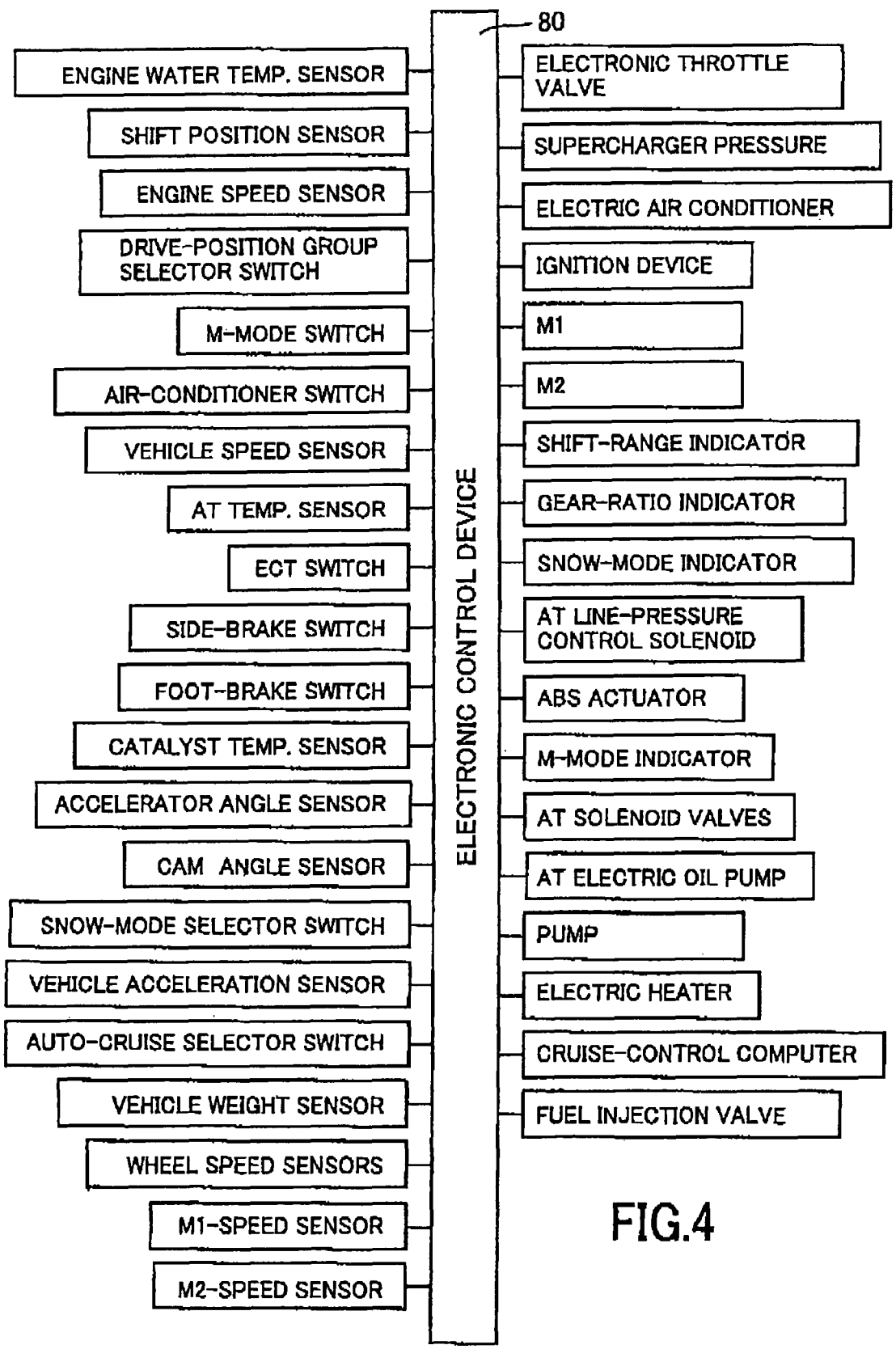
FIG. 4 is a view showing an electronic control unit with input and output signals associated therewith which is provided in the vehicular drive system shown in FIG. 1.

FIG. 4 shows an electronic control unit 80 operative to control the transmission mechanism 10 of the present invention for generating various output signals in response to various input signals. The electronic control unit 80 includes a so-called microcomputer incorporating a CPU, a ROM, a RAM and an input/output interface, and is arranged to process the signals according to programs stored in the ROM while utilizing a temporary data storage function of the ROM, to implement hybrid drive controls of the engine 8 and first and second electric motors M1 and M2, and drive controls such as shifting controls of the automatic transmission portion 20.

The electronic control unit 80, connected to various sensors and switches as shown in FIG. 4, receives various signals such as: a signal indicative of an engine coolant temperature $TEMP_W$; a signal indicative of a shift position $P_{SH}$ selected with a shift lever 52 (shown in FIG. 7) and a signal indicative of the number of operations initiated on the "M" position; a signal indicative of the engine speed $N_E$ representing the rotational speed of the engine 8; a signal indicative of a gear train preset value; a signal commanding an M mode (manual shift running mode); a signal indicative of an operated state of an air conditioner; a signal indicative of the rotational speed (hereinafter referred to as "output shaft speed") $N_{OUT}$ of the output shaft 22; a signal indicative of a temperature $T_{OIL}$ of a working oil of the automatic transmission portion 20.

Figure 7:
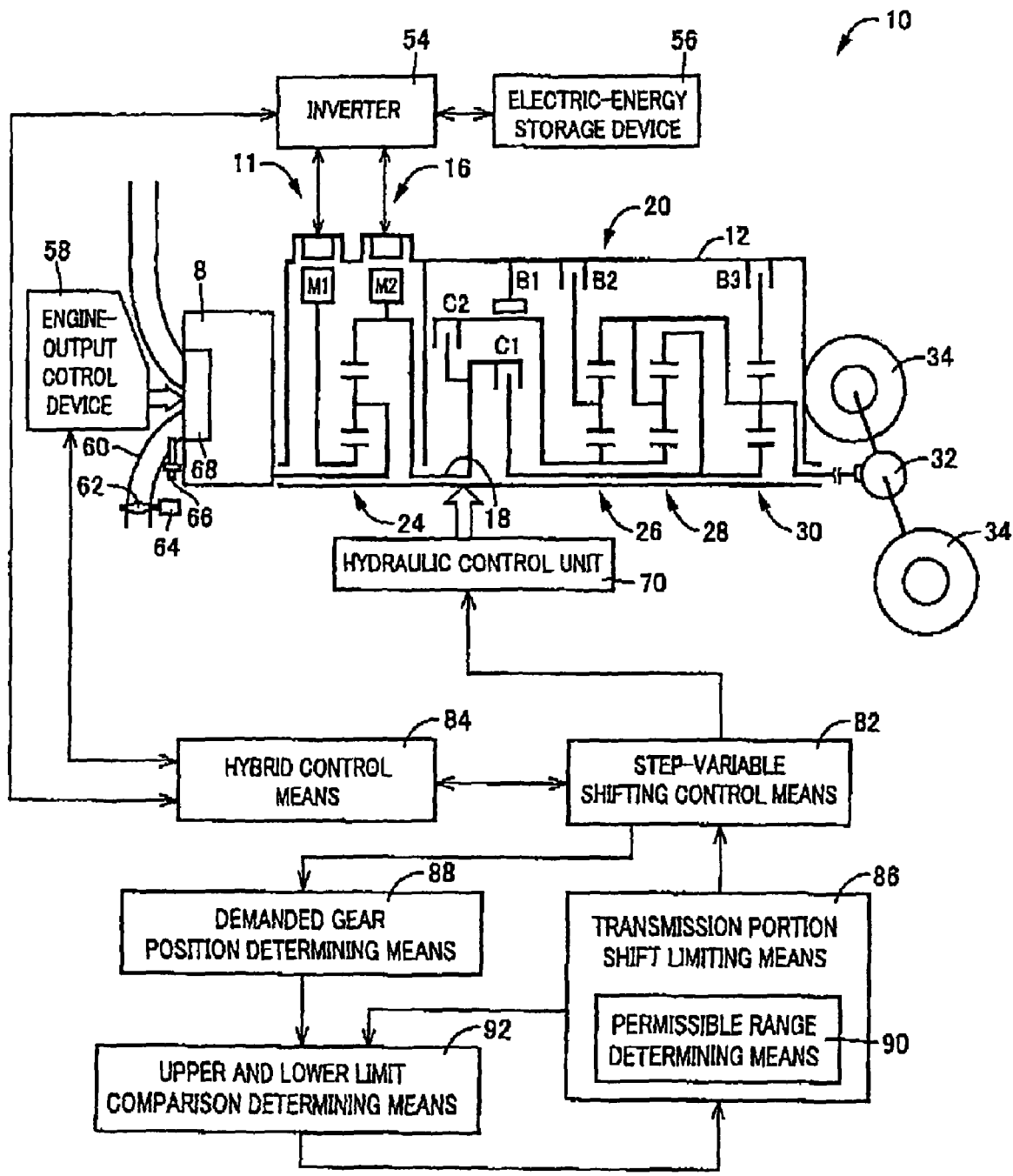
FIG. 7 is a functional block diagram illustrating major control functions of the electronic control unit of FIG. 4.

The electronic control unit 80 also receives a signal indicative of a side brake under operation; a signal indicative of a foot brake under operation; a signal indicative of a temperature of a catalyst; a signal indicative of an accelerator opening Acc representing an operating stroke of an accelerator pedal when manipulated by a driver for his output demand value; a signal indicative of a cam angle; a signal indicative of a snow mode under setting; a signal indicative of a fore and aft acceleration value G of the vehicle; a signal indicative of an auto-cruising drive mode; a signal indicative of a weight 'vehicle weight) of the vehicle; a signal indicative of a wheel velocity of each drive wheel; a signal indicative of a rotational speed $N_{M1}$ of the first electric motor M1 (hereinafter referred to as "first-electric motor speed $N_{M1}$); a signal indicative of a rotational speed $N_{M2}$ of the second electric motor M2 (hereinafter referred to as "second-electric motor speed $N_{M2}$); and a signal indicative of a state of charge SOC stored in an electric-energy storage device 60 (see FIG. 7).

The electronic control unit 80 generates various signals including: a control signal applied to an engine output control device 58 (see FIG. 7) for controlling an engine output, i.e., a drive signal applied to a throttle actuator 64 for controlling a throttle valve opening $\theta_{TH}$ of an electronic throttle valve 62 disposed in an intake manifold 60 of the engine 8; a fuel supply quantity signal applied to a fuel injecting device 66 for controlling an amount of fuel injected into the intake manifold 60 or cylinders of the engine 8; an ignition signal applied to an ignition device 68 to control the ignition timing of the engine 8; a supercharger pressure regulation signal for regulating a supercharger pressure of the engine 8; an electric air-conditioner drive signal for actuating an electric air-conditioner; command signals for commanding the operations of the first and second electric motors M1 and M2; a shift-position (manipulated position) display signal for actuating a shift-range indicator; a gear-ratio indicating signal for displaying the gear ratio.

The electronic control unit 80 also generates snow-mode display signal for displaying the presence of a snow-mode; an ABS actuation signal for operating an ABS actuator to preclude slippages of the drive wheels during a braking phase; an M-mode display signal for displaying an M-mode being selected; valve command signals for actuating electromagnetic valves (linear solenoid valves), incorporated in the hydraulic control unit 70 (see FIGS. 5 and 7) for controlling the hydraulic actuators of the hydraulically operated frictional coupling devices of the differential portion 11 and automatic transmission portion 20; a signal for regulating a regulator valve (pressure regulator valve), incorporated in the hydraulic control unit 70, to regulate a line pressure PL; a drive command signal for actuating an electric hydraulic pump acting as a hydraulic original-pressure source for the line pressure $P_L$ to be regulated; a signal for driving an electric heater; and a signal applied to a cruise-control computer.

Figure 5:
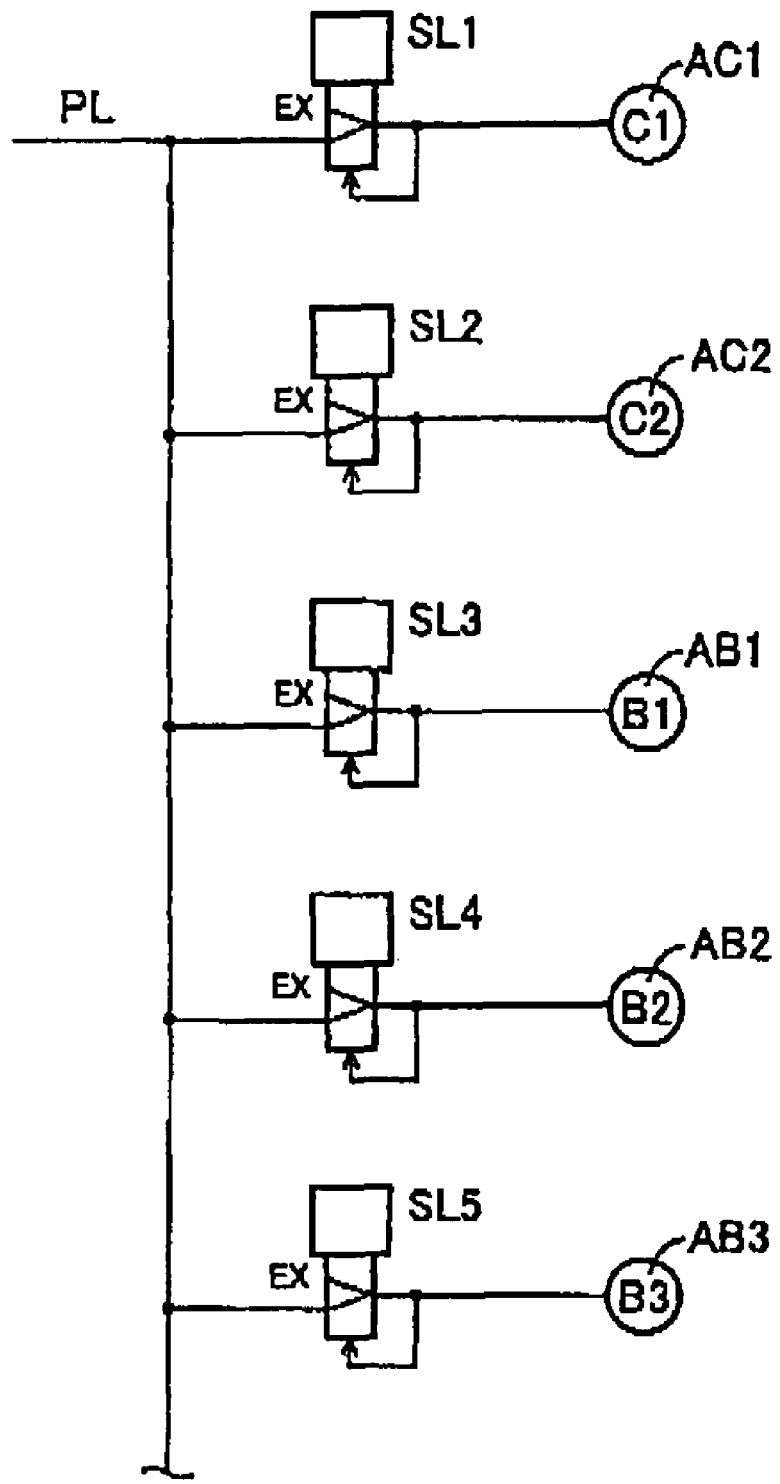
FIG. 5 is a circuit diagram showing a major portion of a hydraulic control circuit associated with linear solenoid valves arranged to control operations of respective hydraulic actuators of clutches C and brakes B.

FIG. 5 is a circuit diagram related to linear solenoid valves SL1 to SL5 of the hydraulic control circuit 70 for controlling the operations of respective hydraulic actuators (hydraulic cylinders) AC1, AC2, AB1, AB2, AB3 of the clutches C1, C2 and brakes B1 to B3.

As shown in FIG. 5, the hydraulic actuators AC1, AC2, AB1, AB2, AB3 are connected to the respective linear solenoid valves SL1-SL5, which are controlled in response to control commands, delivered from the electronic control unit 80. This adjusts the line pressure PL into respective clutch engaging pressures PC1, PC2, PB1, PB2 and PB3 to be applied directly to the respective hydraulic actuators AC1, AC2, AB1, AB2, AB3. The line pressure PL represents an original hydraulic pressure, generated by an electrically operated hydraulic oil pump (not shown) or a mechanical oil pump driven by the engine 30, which is regulated by a relief-type pressure regulator valve depending: on a load of the engine 8 in terms of an accelerator opening displacement $A_{CC}$ or a throttle valve opening $\theta_{TH}$.

The linear solenoid valves SL1 to SL5, fundamentally formed in the same structure, are independently energized or de-energized with the electronic control unit 80. This allows the hydraulic actuators AC1, AC2, AB1, AB2, AB3 to independently and controllably regulate hydraulic pressures, thereby controlling the clutch engaging pressures PC1, PC2, PB1, PB2, PB3. With the automatic transmission portion 20, predetermined coupling devices are coupled in a pattern indicated on, for instance, the coupling-operation indicating table shown in FIG. 2, thereby establishing various gear positions. In addition, during the shifting control of the automatic transmission portion 20, a so-called clutch-to-clutch shifting is executed to simultaneously control the coupling or uncoupling of the clutches C and the brakes B relevant to the shifting operations.

Figure 6:
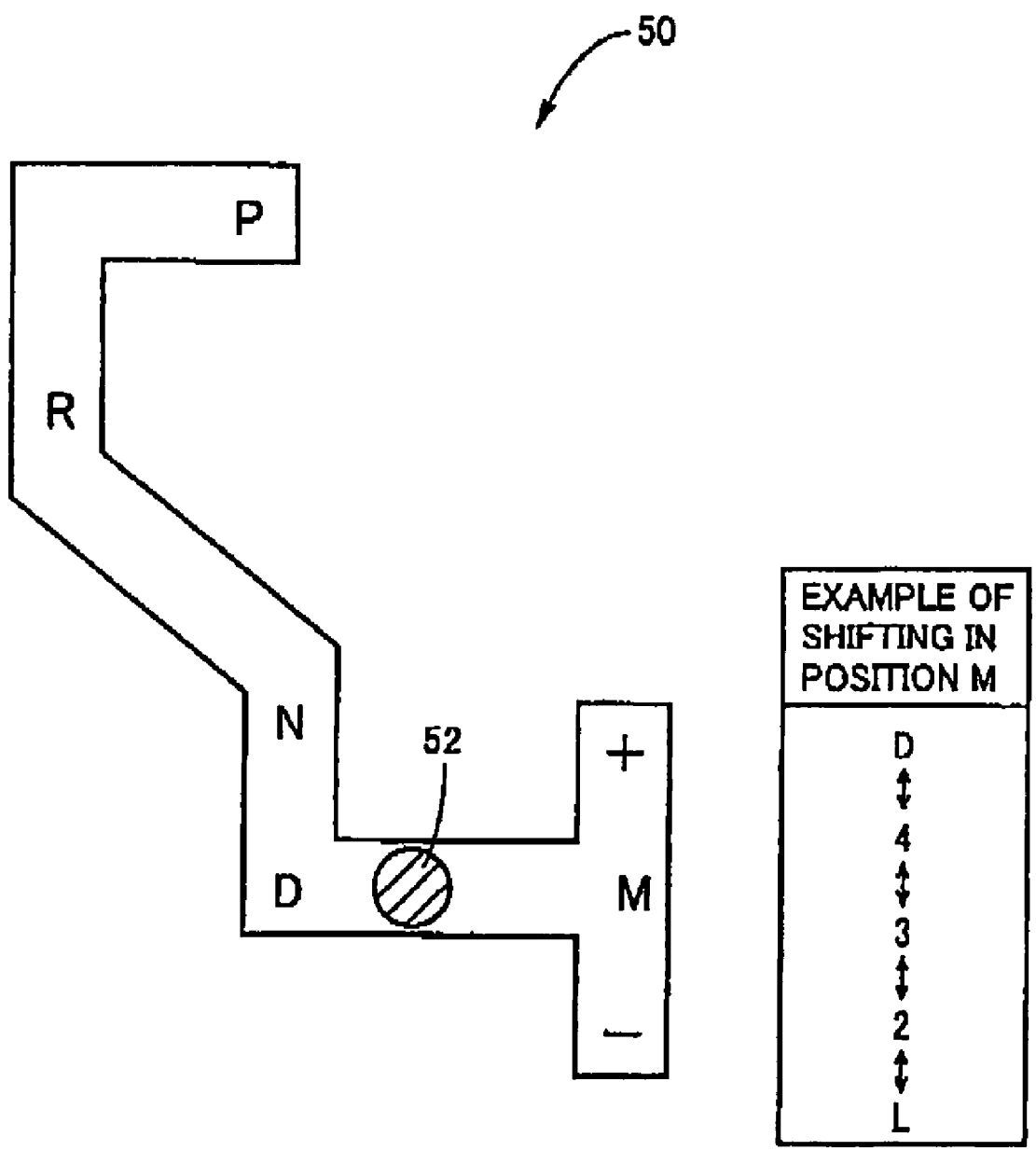
FIG. 6 is a view showing one example of a manually operated shifting device including a shift lever and operable to select one of a plurality of shift positions of multiple kinds.

FIG. 6 is a view showing one example of a manually operated shifting device 50 serving as a changeover device operative to shift multiple kinds of shift positions $P_{SH}$ on manual operation. The shifting device 50 is mounted in, for instance, an area lateral to a driver's seat and includes a shift lever 52 to be manipulated for selecting one of the plurality of shift positions $P_{SH}$.

The shift lever 52 has a parking position "P" (Parking) under which an inside of the transmission mechanism 10, i.e., the power transmitting path inside the automatic transmission portion 20 is shut off in a neutral condition, i.e., a neutral state with the output shaft 22 of the automatic transmission portion 20 remained in a locked state; a reverse drive position "R" (Reverse) for a reverse drive mode; a neutral position "N" (Neutral) for the power transmitting path of the transmission mechanism 10 to be shut off in the neutral state, an automatic forward-drive running position "D" (Drive); and a manual-shift forward-drive running position "M" (Manual). In the automatic forward-drive running position "D", an automatic shift mode is established for executing an automatic shift control within a varying range of a shiftable total speed ratio γT of the transmission mechanism 10 resulting from various gear positions whose automatic shift control is performed in a continuously variable speed ratio width of the differential portion 11 and a range of the 1st-speed to the 4th-speed gear positions of the automatic transmission portion 20. The manual-shift forward-drive position "M" is manually shifted to establish a manual-shift forward-drive mode (manual mode) for setting a so-called shift range to limit a shifting gear position on a high speed range during the operation of the automatic transmission portion 20 under the automatic shift control.

As the shift lever 52 is shifted to the various shift positions $P_{SH}$, the hydraulic control circuit 70 is electrically switched, thereby obtaining the reverse-drive "R" gear position, the neutral position "N" and the various gear shift positions or the like in the forward-drive gear position "D".

Among the various shift positions $P_{SH}$ represented in the "P" to "M" positions, the "P" and "N" positions represent non-running positions selected when no vehicle is caused to run. That is, the "P" and "N" positions represent non-drive positions selected when the first and second clutches C1, C2 select to cause the power transmitting path to be switched to a power cut-off state like a situation where as indicated in, for instance, the coupling operation indicating table shown in FIG. 2, both the first and second clutches C1, C2 are uncoupled to interrupt the power transmitting path inside the automatic transmission portion 20 so as to disenable the driving of the vehicle.

The "R", "D" and "M" positions represent running positions selected when the vehicle is caused to run. That is, these positions represent drive positions selected when the first and/or second clutches C1, C2 select to cause the power transmitting path to be switched to a power transmitting state like a situation where as indicated in, for instance, the coupling operation indicating table shown in FIG. 2, at least one of the first and second clutches C1, C2 is coupled to establish the power transmitting path inside the automatic transmission portion 20 so as to enable the vehicle to be driven.

More particularly, as the shift lever 52 is manually shifted from the "P" position or the "N" position to the "C" position, the second clutch C2 is coupled to cause the power transmitting path of the automatic transmission portion 20 to be switched from the power cut-off state to the power transmitting state. With the shift lever 52 manually shifted from the "N" position to the "D" position, at least the first clutch C1 is coupled to switch the power transmitting path of the automatic transmission portion 20 from the power cut-off state to the power transmitting state. Further, as the shift lever 52 is manually shifted from the "R" position to the "P" or "N" position, the second clutch C2 is uncoupled to switch the power transmitting path of the automatic transmission portion 20 from the power transmitting state to the power cut-off state. With the shift lever 52 manually shifted from the "D" position to the "N" position, the first clutch C1 or second clutch C1 is uncoupled to switch the power transmitting path of the automatic transmission portion 20 from the power transmitting state to the power cut-off state.

FIG. 7 is a functional block diagram illustrating major control functions to be executed by the electronic control unit 80. Step-variable shifting control means 82 determines a shift demand to the automatic transmission portion 20 based on the output shaft rotational-speed relevant value and a driver's request to cause the automatic transmission portion to execute the automatic shift control so as to obtain a demanded shift position in response to the shift demand. For instance, the step-variable shifting control means 82 determines whether to execute the shifting of the automatic transmission portion 20, i.e., the gear position to be shifted for causing the automatic transmission portion to execute the automatic shift control, based on the vehicle condition, represented by an actual vehicle speed V and the accelerator opening Acc by referring to the relationships (shifting lines and shifting map) involving upshift lines (in solid lines) and downshift lines (in single dot lines) that are preliminarily stored as parameters of the vehicle speed V and the accelerator opening Acc represented in FIG. 8. Here, although the driver's request is represented by the accelerator opening Acc and, instead thereof, may be represented by a demanded output torque $T_{OUT}$ of the automatic transmission portion 20 or the throttle opening $\theta_{TH}$ or the like.

When this takes place, the step-variable shifting control means 82 outputs commands (a shift output command and a hydraulic pressure command) to the hydraulic control circuit 70 for coupling and/or uncoupling the hydraulically operated frictional coupling devices, involved in the shifting of the automatic transmission portion 20 so as to establish the gear position in accordance with the coupling table shown in FIG. 2. That is, the step-variable shifting control means 82 outputs a command to the hydraulic control circuit 70 for uncoupling the on-uncoupling coupling device, involved in the shifting, while coupling the on-coupling coupling device to cause the clutch-to-clutch shifting to be executed. Upon receipt of such commands, the hydraulic control circuit 70 causes the linear solenoid valves SL of the automatic transmission portion 20 to be actuated. This allows the hydraulically operated actuators of the hydraulically operated frictional coupling devices, involved in the relevant shifting, to be actuated. Thus, for instance, the on-uncoupling coupling device is uncoupled and the on-coupling coupling device is coupled, causing the automatic transmission portion 20 to execute the shifting.

Hybrid control means 84 operates the engine 8 in an optimum operating range at a high efficiency while distributing the drive forces of the engine 8 and the second electric motor M2 at optimum rates and optimally varying a reacting force of the first electric motor M1 during the operation thereof to generate electric power, thereby controllably operating the differential portion 11 under an electrically controlled continuously variable transmission to control a speed ratio $\gamma 0$. At a vehicle speed V during the running of the vehicle in one occasion, for instance, a target (demanded) output for the vehicle is calculated based on the accelerator opening Acc and the vehicle speed V both of which represent output demanded variables of the driver, after which a demanded total target output is calculated based on the target output of the vehicle and a battery charge demanded value. Subsequently, a target engine output is calculated in consideration of a loss in power transmission, loads of auxiliary units, assist torque of the second electric motor M2 or the like so as to obtain the total target output. Then, the hybrid control means 84 controls the engine 8, while controlling a rate of electric power being generated by the first electric motor M1, so as to obtain the engine speed $N_E$ and engine torque $T_E$ such that the target engine output is obtained.

The hybrid control means 84 executes such controls in consideration of, for instance, the gear position of the automatic transmission portion 20 with a view to increasing a dynamic performance and improving fuel consumption. During such hybrid controls, the differential portion 11 is caused to operate as the electrically controlled continuously variable transmission such that the engine speed $N_E$ and the vehicle speed V, determined for the engine 8 to operate in the operating range at a high efficiency, match the vehicle speed and the rotational speed of the power transmitting member 18 determined with the gear position in the automatic transmission portion 20.

Figure 9:
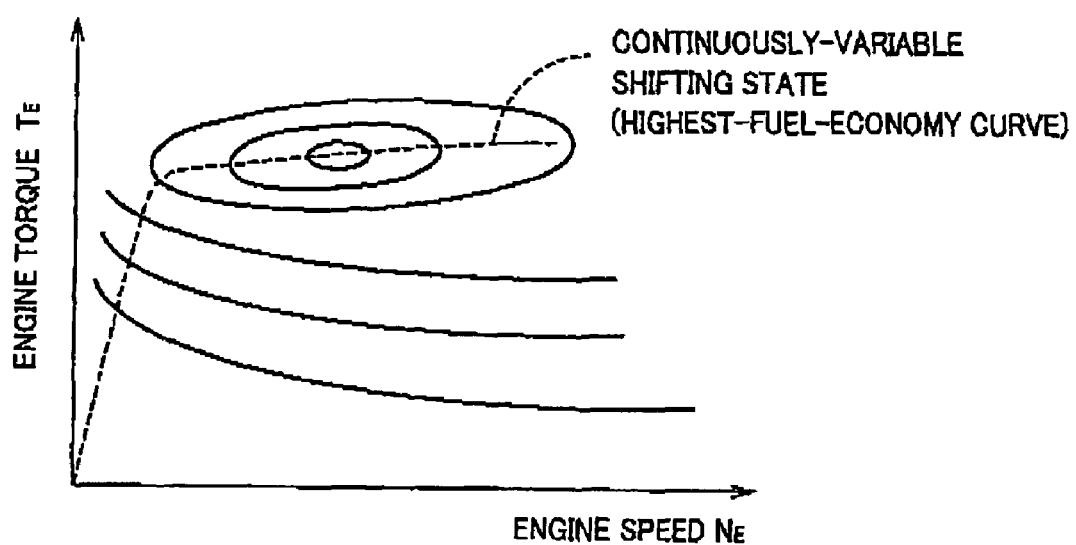
FIG. 9 is a view illustrating one example showing a fuel consumption map with a broken line representing an optimum fuel consumption curve of an engine.

That is, the hybrid control means 84 determines a target value of the total speed ratio γT of the transmission mechanism 10 such that the engine 8 is caused to operate along an optimal fuel efficiency curve (a fuel efficiency map and the relationships) of the engine 8 as indicated by a dotted line in FIG. 9 which is preliminarily and experimentally obtained and prestored. This achieves a compromise between driveability and fuel consumption during the running of the vehicle under a continuously variable shifting mode on a two-dimensional coordinate established with the engine speed $N_E$ and output torque (engine torque) $T_E$ of the engine 8. For instance, the target value of the total speed ratio γT of the transmission mechanism 10 is determined so as to obtain engine torque $T_E$ and the engine speed $N_E$ for generating the engine output demanded for satisfying target outputs (a total target output and demanded drive torque). Then, the speed ratio γ0 of the differential portion 11 is controlled in consideration of the gear position in the automatic transmission portion 20 so as to obtain the relevant target value, thereby controlling the total speed ratio γT within a continuously variable shifting range.

When this takes place, the hybrid control means 84 allows electric energy, generated by the first electric motor M1, to be supplied through an inverter 54 to a battery device 56 and the second electric motor M2. Thus, a major part of drive power of the engine 8 is mechanically transferred to the power transmitting member 18. However, a part of drive power of the engine 8 is consumed with the first electric motor M1 for the generation of electric power and converted into electric energy. Resulting electric energy is supplied through the inverter 54 into the second electric motor M2, which is consequently driven. Therefore, the part of drive power is transferred through the second electric motor M2 to the power transmitting member 18. Equipment, involved in the operations starting from the step of generating electric power to the step of causing the second electric motor M2 to consume resultant electric energy, establishes an electric path in which the part of the drive power of the engine 8 is converted into electric energy and resultant electric energy is converted into mechanical energy.

The hybrid control means 84 allows the differential portion 11 to perform an electrically controlled CVT function for controlling, for instance, a first-electric-motor rotational speed $N_{M1}$ to maintain the engine speed $N_E$ at a nearly constant level or to control the rotational speed at an arbitrary level regardless of the vehicle remaining under a halted condition or a running condition. In other words, the hybrid control means 84 controls the first-electric-motor rotational speed $N_{M1}$ at an arbitrary level while maintaining the engine speed $N_E$ at the nearly constant level or the arbitrary rotational speed.

As will be apparent from the collinear chart shown in FIG. 3, for instance, when raising the engine speed $N_E$ during the running of the vehicle, the hybrid control means 84 raises the first-electric-motor rotational speed $N_{M1}$ while maintaining a second-electric-motor rotational speed $N_{M2}$ at a nearly fixed level that is bound with the vehicle speed V (represented by the drive wheels 34). In addition, when maintaining the engine speed $N_E$ at the nearly fixed level during the shifting of the automatic transmission portion 20, the hybrid control means 84 varies the first-electric-motor rotational speed $N_{M1}$ in a direction opposite to that in which the second-electric-motor rotational speed $N_{M2}$ varies with the shifting of the automatic transmission portion 20 while maintaining the engine speed $N_E$ at the nearly fixed level.

The hybrid control means 84 causes the throttle actuator 64 to controllably open or close the electronic throttle valve 62 for performing a throttle control. In addition, the hybrid control means 84 functionally includes engine output control means that outputs commands to an engine output control device 58 singly or in combination. This causes a fuel injection device 66 to control a fuel injection quantity and a fuel injection timing for fuel injection control while causing an ignition device 68 to control an ignition timing of an ignition device 68 such as an igniter or the like for an ignition timing control. Upon receipt of such commands, the engine output control device 58 executes an output control of the engine 8 so as to provide a demanded engine output.

For instance, the hybrid control means 84 basically drives the throttle actuator 60 in response to the accelerator opening Acc by referring to the prestored relationship (not shown). The throttle control is executed such that the greater the accelerator opening Acc, the larger will be the throttle valve opening $\theta_{TH}$. Upon receipt of the commands from the hybrid control means 84, further, the engine output control device 58 allows the throttle actuator 64 to controllably open or close the electronic throttle valve 62 for throttle control while controlling the ignition timing of the ignition device 68 such as the igniter or the like for ignition timing control, thereby executing an engine torque control.

Further, the hybrid control means 84 is operative to cause the differential portion 11 to perform the electrically controlled CVT function (differential action) to achieve the motor drive mode regardless of the engine 8 remaining under the halted condition or an idling state.

Figure 8:
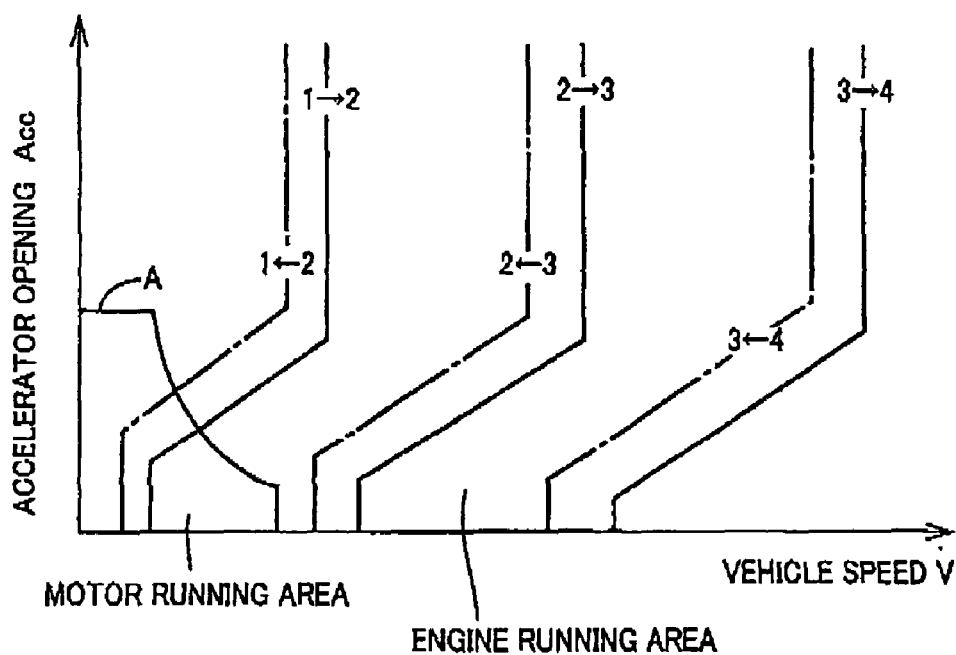
FIG. 8 is a view illustrating one example of a shifting map for use in performing a shifting control of the drive system and one example of drive-power-source map defining boundary lines for use in a drive-power-source switching control between an engine-drive mode and a motor-drive mode with those maps being related to each other.

For instance, the hybrid control means 84 determines whether the vehicle remains in the motor-drive running region or the engine-drive running region based on the vehicle condition, represented by the actual vehicle speed V and the accelerator opening Acc, by referring to the relationship (drive-power-source switching lines and drive-power-source map) shown in FIG. 8 for thereby executing either a motor-drive running mode or an engine-drive running mode. The relationship, shown in FIG. 8, has boundary lines, prestored as parameters involving the vehicle speed V and the accelerator opening Acc, between the motor-drive running region and the engine-drive running region for switching a running drive-power source between the engine 8 and the second electric motor M2. The drive-power-source map A, shown by a solid line in FIG. 8, is prestored together with a shifting map represented by, for instance, solid lines and single dot lines. As will be apparent from FIG. 8, the hybrid control means 84 executes the motor-drive running mode in a relatively low output torque range $T_{OUT}$, regarded to be generally lower in engine efficiency than that of the engine operating in a high output torque range, i.e., a low accelerator opening Acc representing a low engine torque Te range or a relatively low vehicle speed range of the vehicle speed A, i.e., a low load range.

In order to suppress a drag of the engine 8 being halted for improving fuel consumption during such a motor-drive running mode, the hybrid control means 84 controls the first-electric-motor rotational speed $N_{M1}$ in a negative rotational speed to render, for instance, the first electric motor operative under an unloaded condition, thereby achieving an idling state. By so doing, the engine speed $N_E$ is zeroed or nearly zeroed depending on needs due to the electrically controlled CVT function (differential action) of the differential portion 11.

Even if the engine-drive running region is present, the hybrid control means 84 allows the first electric motor M1 and/or the battery device 56 to supply electric energy to the second electric motor M2 using the electrical path mentioned above. This drives the second electric motor M2 to apply torque to the drive wheels 34, making it possible to provide a so-called torque-assist for assisting drive power of the engine 8.

The hybrid control means 84 renders the first electric motor M1 operative under the unloaded condition to freely rotate in the idling state. This makes it possible to cause the differential portion 11 to interrupt a torque transfer; i.e., the differential portion 11 is rendered inoperative with no output being provided under the same state as that in which the power transmitting path is disconnected in the differential portion 11. That is, the hybrid control means 84 places the first electric motor M1 in the unloaded condition, making it possible to place the differential portion 11 in a neutral condition (neutral state) in which the power transmitting path is electrically disconnected.

Meanwhile, the shifting map, shown in FIG. 8, is set in consideration of the rotational speed of the given element of, for instance, the differential portion 11, i.e., more particularly, in a way to prevent the rotational speed, related to the given element, from high rotation.

For instance, respective upshift lines and downshift lines, forming the respective gear positions (speed ratios) in the automatic transmission portion 20, are set at values in consideration of durability of the first electric motor M1 to prevent the first-electric-motor rotational speed $N_{M1}$ from high rotation (i.e., at a speed greater than a high rotational speed in the order of approximately, for instance, 10000 rpm). That is, the respective upshift lines and downshift lines are set at the values to prevent the high rotation of the first-electric-motor rotational speed $N_{M1}$. The first-electric-motor rotational speed $N_{M1}$ is determined based on the relationship of the mutually relative rotating speeds in the differential portion 11 among a power-transmitting-member rotational speed $N_{18}$ (=output-shaft-rotating speed $N_{OUT}$×speed ratio γ), uniquely determined with the output-shaft-rotational speed $N_{OUT}$ and the speed ratio of the automatic transmission portion 20, the engine speed $N_E$ and the first-electric-motor rotational speed $N_{M1}$.

Besides, the respective upshift lines and downshift lines are set in consideration of durability of, for instance, the second electric motor M2 so as to prevent the high rotation of the second-electric-motor rotational speed $N_{M2}$, representing the same rotational speed as the first-electric-motor rotational speed $N_{M1}$. Or, the upshift lines and downshift lines are set in consideration of durability of, for instance, a pinion gear, i.e., a first planetary gear P1 (i.e., for instance, a needle bearing mounted in the first planetary gear P1 to rotatably support a pinion shaft so as to allow the first carrier CA1 to rotatably support the first planetary gear P1 in rotation on its axis and orbital motion), included in the first planetary gear set 24 forming the power distributing mechanism 16. This prevents the high rotation of the rotational speed (the first-electric-motor rotational speed $N_{M1}$) of the first planetary gear P rotating on its axis.

That is, the respective upshift lines and downshift lines are set so as to prevent the high rotation of a first-planetary-gear rotational speed $N_{P1}$ that is determined based on a rotational speed difference $\Delta N_{P1}$ between the transmitting-member rotational speed $N_{18}$ (the rotational speed of the first ring gear R1) and the engine speed $N_E$ (the rotational speed of the first carrier CA1). Also, the first-planetary-gear rotational speed $N_{P1}$ is set such that the greater the rotational speed difference $\Delta N_{P1}$, the higher will be the first-planetary-gear rotational speed $N_{P1}$.

However, an attention is needed when with the step-variable shifting control means 82 causes the automatic transmission portion 20 to execute the shifting in accordance with the shift demand to the automatic transmission portion 20, determined based on the output-shaft rotational speed relevant value and the driver's request, i.e., for instance, the demanded shifting gear position determined based on the vehicle speed and the accelerator opening Acc. That is, under a situation where an actual engine speed $N_E$ is caused to change in accordance with a target engine speed $N_{Et}$ (=output-shaft-rotating speed $N_{OUT}$×target value of the total speed ratio γT) based on a target value of, for instance, the total speed ratio γT of the shifting mechanism 10, it is conceived that the engine speed $N_E$ has a deterioration in following capability (response) for the variations in the accelerator opening Acc and the throttle valve opening $\theta_{TH}$ representing the driver's request. Then, there is a likelihood that depending on the demanded gear position of the automatic transmission portion 20, the first electric motor M1 is inevitably involved in a high speed revolution and the first planetary gear P1 is involved in a high speed rotation even if the automatic transmission portion 20 executes the shifting in accordance with the shifting map preset so as to prevent the high rotation of the rotational speed related to the given element of the differential portion 11.

Examples of the shift demand to the automatic transmission portion 20 supposedly include, in addition to the shift demand determined based on the shifting map, a shift demand for a well-known cruising control, a shift demand arising from the shift lever 52 being manually operated to the "M" position, and a shift demand arising for a well-known ascending/descending control, etc. These shift demands occur with no rotational speed of the given element of the differential portion 11 taken into consideration in contrast to the shift demand determined by referring to the shifting map. This results in a likelihood that depending on the demanded gear position for the automatic transmission portion 20, the first and second electric motors M1, M2 are caused to rotate at high speeds and the first planetary gear P1 is caused to rotate at a high speed.

Thus, executing the demanded shifting in the automatic transmission portion 20 causes likelihood to occur with the first and second electric motors M1, M2 rotating at the high speeds and the first planetary gear P1 rotates at the high speed.

For instance, one example of the case in which the first electric motor M1 rotates at the high speed on a positive side with the automatic transmission portion 20 executing the demanded shifting is supposed to occur when the engine speed $N_E$ is relatively higher than the output-shaft-rotational speed $N_{OUT}$ and the first-electric-motor rotational speed $N_{M1}$ exceeds a given value under which an upshift is required for further raising the first-electric-motor rotational speed $N_{M1}$.

For instance, one example of the case in which the first electric motor M1 rotates at the high speed on a negative side with the automatic transmission portion 20 executing the demanded shifting is supposed to occur, when the engine speed $N_E$ shifting mechanism 10, it is conceived that the engine speed $N_E$ has a deterioration in following capability (response) for the variations in the accelerator opening Acc and the throttle valve opening $\theta_{TH}$ representing the driver's request. Then, there is a likelihood that depending on the demanded gear position of the automatic transmission portion 20, the first electric motor M1 is inevitably involved in a high speed revolution and the first planetary gear P1 is involved in a high speed rotation even if the automatic transmission portion 20 executes the shifting in accordance with the shifting map preset so as to prevent the high rotation of the rotational speed related to the given element of the differential portion 11.

Examples of the shift demand to the automatic transmission portion 20 supposedly include, in addition to the shift demand determined based on the shifting map, a shift demand for a well-known cruising control, a shift demand arising from the shift lever 52 being manually operated to the "M" position, and a shift demand arising for a well-known ascending/descending control, etc. These shift demands occur with no rotational speed of the given element of the differential portion 11 taken into consideration in contrast to the shift demand determined by referring to the shifting map. This results in a likelihood that depending on the demanded gear position for the automatic transmission portion 20, the first and second electric motors M1, M2 are caused to rotate at high speeds and the first planetary gear P1 is caused to rotate at a high speed.

Thus, executing the demanded shifting in the automatic transmission portion 20 causes likelihood to occur with the first and second electric motors M1, M2 rotating at the high speeds and the first planetary gear P1 rotates at the high speed.

For instance, one example of the case in which the first electric motor M1 rotates at the high speed on a positive side with the automatic transmission portion 20 executing the demanded shifting is supposed to occur when the engine speed $N_E$ is relatively higher than the output-shaft-rotational speed $N_{OUT}$ and the first-electric-motor rotational speed $N_{M1}$ exceeds a given value under which an upshift is required for further raising the first-electric-motor rotational speed $N_{M1}$.

For instance, one example of the case in which the first electric motor M1 rotates at the high speed on a negative side with the automatic transmission portion 20 executing the demanded shifting is supposed to occur, when the engine speed $N_E$ the high speed.

More particularly, demanded gear position determining means 88 determines a demanded gear position for the shift demand to the automatic transmission portion 20. For instance, the demanded gear position determining means 88 normally determines a demanded gear position, determined by the step-variable shifting control means 82 based on the vehicle speed V and the accelerator opening Acc by referring to the shifting map, to be a demanded gear position for the automatic transmission portion 20. In addition, if there are a shift demand for a cruising control, a shift demand caused by the manual operation of the shift lever 52 in the "M" position and a shift demand for an ascending/descending control, etc., the demanded gear position determining means 88 determines the demanded gear position for the automatic transmission portion 20 according to an order of a given predetermined precedence i.e., priority from among the demanded gear positions of the respective shift demands involving the demanded gear positions derived from the step-variable shifting control means 82.

The transmission portion shift limiting means 86 includes permissible range determining means 90 that determines whether or not the demanded gear position of the automatic transmission portion 20 remains in a permissible range by referring to the relationship between the output rotational-speed relevant value of the automatic transmission portion 20 and the engine speed $N_E$. This prevents the rotational speed, related to the given element of the differential portion 11, from high rotation. The transmission portion shift limiting means 86 determines whether or not the gear position of the automatic transmission portion 20 is available as a selectable upper and lower limit gear position. This prevents, for instance, the first electric motor M1, the second electric motor M2 and the first planetary gear P1 from rotating at the high speeds.

For instance, the permissible range determining means 90 determines a selectable upper and lower limit gear position as the gear position of the automatic transmission portion 20. This determination is executed on the vehicle condition represented with the actual output shaft rotational speed $N_{OUT}$ and the engine speed $N_E$ by referring to the relationship (an upper and lower limit gear position map) having boundary lines (in solid lines and broken lines) based on which the upper and lower limit gear position, preliminarily and experimentally obtained and is relatively lower than the output-shaft-rotational speed $N_{OUT}$ and the first-electric-motor rotational speed $N_{M1}$ exceeds the given value under which the downshift is required to further lower the first-electric-motor rotational speed $N_{M1}$.

For instance, one example of the case in which the first electric motor M2 rotates at the high speed with the automatic transmission portion 20 executing the demanded shifting is supposed to occur when the output-shaft-rotational speed $N_{OUT}$ is high and the second-electric-motor rotational speed $N_{M2}$ exceeds a given value under which the downshift is required to further raise the second-electric-motor rotational speed $N_{M2}$.

For instance, one example of the case in which the first planetary gear P1 rotates at the high speed with the automatic transmission portion 20 executing the demanded shifting is supposed to occur, when the engine speed $N_E$ is relatively higher than the output-shaft-rotational speed $N_{OUT}$ and the first-planetary-gear rotational speed $N_{P1}$ (or the rotational speed difference $\Delta N_{P1}$) exceeds a given value under which the upshift is required to further raise the first-planetary-gear rotational speed $N_{P1}$ (or further increase the rotational speed difference $\Delta N_{P1}$). Besides, such a case is supposed to occur when the engine speed $N_E$ is relatively lower than the output-shaft-rotational speed $N_{OUT}$ and the first-planetary-gear rotational speed $N_{P1}$ (or the rotational speed difference $\Delta N_{P1}$) exceeds the given value under which the downshift is required to further raise the first-planetary-gear rotational speed $N_{P1}$ (or further increase the rotational speed difference $\Delta N_{P1}$).

Therefore, the vehicular drive system of the present embodiment includes transmission portion shift limiting means 86 that upon receipt of the shift demand to the automatic transmission portion 20, makes a determination in consideration of the rotational speed of the given element of the differential portion 11 whether or not a demanded gear position lies in a permissible range of the automatic transmission portion 20 based on which the shifting of the automatic transmission portion 20 is limited. If there is a likelihood of the automatic transmission portion 20 executing the demanded shifting causing the given element of the differential portion 11 to rotate in high speed, then, the transmission portion shift limiting means 86 limits the shifting of the automatic transmission portion 20. Such a likelihood occurs when, for instance, the first and second electric motors M1, M2 rotate at the high speeds and the first-planetary-gear rotational speed $N_{P1}$ rotates at the high speed.

More particularly, demanded gear position determining means 88 determines a demanded gear position for the shift demand to the automatic transmission portion 20. For instance, the demanded gear position determining means 88 normally determines a demanded gear position, determined by the step-variable shifting control means 82 based on the vehicle speed V and the accelerator opening Acc by referring to the shifting map, to be a demanded gear position for the automatic transmission portion 20. In addition, if there are a shift demand for a cruising control, a shift demand caused by the manual operation of the shift lever 52 in the "M" position and a shift demand for an ascending/descending control, etc., the demanded gear position determining means 88 determines the demanded gear position for the automatic transmission portion 20 according to an order of a given predetermined precedence i.e., priority from among the demanded gear positions of the respective shift demands involving the demanded gear positions derived from the step-variable shifting control means 82.

The transmission portion shift limiting means 86 includes permissible range determining means 90 that determines whether or not the demanded gear position of the automatic transmission portion 20 remains in a permissible range by referring to the relationship between the output rotational-speed relevant value of the automatic transmission portion 20 and the engine speed $N_E$. This prevents the rotational speed, related to the given element of the differential portion 11, from high rotation. The transmission portion shift limiting means 86 determines whether or not the gear position of the automatic transmission portion 20 is available as a selectable upper and lower limit gear position. This prevents, for instance, the first electric motor M1, the second electric motor M2 and the first planetary gear P1 from rotating at the high speeds.

Figure 10:
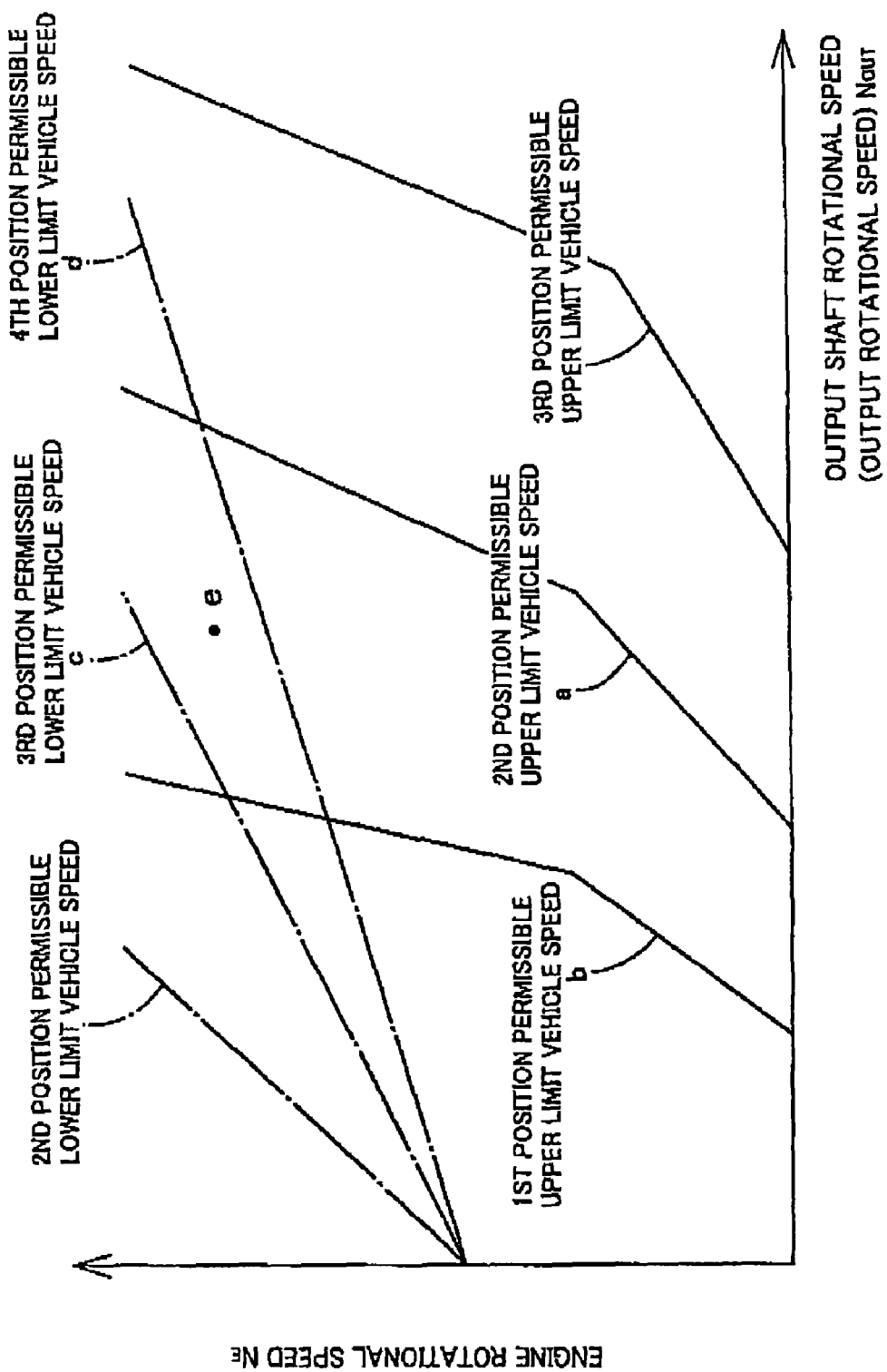
FIG. 10 is a view showing one example of upper and lower limit gear position map for use in determining whether or not upper and lower limit gear positions are selectable as a gear position of an automatic transmission portion.

For instance, the permissible range determining means 90 determines a selectable upper and lower limit gear position as the gear position of the automatic transmission portion 20. This determination is executed on the vehicle condition represented with the actual output shaft rotational speed $N_{OUT}$ and the engine speed $N_E$ by referring to the relationship (an upper and lower limit gear position map) having boundary lines (in solid lines and broken lines) based on which the upper and lower limit gear position, preliminarily and experimentally obtained and prestored, is determined in terms of parameters of the actual output shaft rotational speed $N_{OUT}$ and the engine speed $N_E$ as shown in FIG. 10. Moreover, a selectable upper and lower limit gear position common to a selectable upper and lower limit gear position in case of using the actual engine speed $N_E$ and a selectable upper and lower gear position in case of using the target engine speed $N_{E1}$ may be determined to be a finally selectable upper and lower limit gear position.

In FIG. 10, solid lines, indicative of upper limit vehicle speeds at each of which the shifting is permitted, can be used for determining the selectable lower limit gear position. The upper limit vehicle speed is set based on the relationship of the mutually relative rotating speed of the respective rotary elements of the differential portion 11 involving the actual output shaft rotational speed $N_{OUT}$ and the engine speed $N_E$ so as to prevent, for instance, the first electric motor M1 from rotating at a high speed in a negative phase.

Further, single dot lines represent the lower limit vehicle speeds based on which the selectable upper limit gear position is determined. The lower limit vehicle speed is set based on the relationship related to the mutually relative rotating speed of the respective rotary elements of the differential portion 11 involving the actual output shaft rotational speed $N_{OUT}$ and the engine speed $N_E$. This prevents, for instance, the first electric motor M1 from rotating at a high speed in a positive phase. In addition, the upper and lower limit vehicle speeds, represented by the solid lines and the single dot lines, are set to respective values such that, for instance, the second electric motor M2 and the first planetary gear P1 do not rotate at a high speed.

For instance, the solid line "a", representing an upper limit vehicle speed permissible for the shifting to be executed up to a 2nd-speed gear position, is used for determining whether to treat a selectable lower limit gear position as the 2nd-speed gear position. In addition, the solid line "b", representing an upper limit vehicle speed permissible for the shifting to be executed up to a 1st-speed gear position, is used for determining whether to treat the selectable lower limit gear position as the 1st-speed gear position. The selectable lower limit gear position is set to the 2nd-speed gear position for a lower vehicle speed region and a higher engine speed region with respect to the solid line "a" and for a higher vehicle speed region and a lower engine speed region with respect to the solid line "b".

Further, the single dot line "c", representing the lower limit vehicle speed permissible for the shifting to be executed up to a 3rd-speed gear position, is used for determining whether to treat the selectable upper limit gear position as the 3rd-speed gear position. The single dot line "d", representing the lower limit vehicle speed permissible for the shifting to be executed up to a 4th-speed gear position, is used for determining whether to treat the selectable upper limit gear position as the 4th-speed gear position. The selectable upper limit gear position is set to the 3rd-speed gear position for a higher vehicle speed and a lower engine speed with respect to the single dot line "c" and for a lower vehicle speed side and a higher engine speed side with respect to the single dot line "d".

Accordingly, if the vehicle condition remains under a state indicated at a point "e" in FIG. 10, the 2nd-speed gear position is determined to be the selectable lower limit gear position and the 3rd-gear position is determined to be the selectable upper limit gear position.

Upper and lower limit comparison determining means 92 makes a comparison between the demanded gear position of the automatic transmission portion 20, determined with the demanded gear position determining means 88, and the upper and lower limit gear positions selected as the gear position of the automatic transmission portion 20 determined with the permissible range determining means 90. That is, the upper and lower limit comparison determining means 92 determines whether or not the demanded gear position remains in the permissible range, i.e., for instance, whether or not the demanded gear position is less than the upper limit gear position or whether or not the demanded gear position is greater than the lower limit gear position.

If the upper and lower limit comparison determining means 92 determines that the demanded gear position of the automatic transmission portion 20, determined with the demanded gear position determining means 88, remains in the permissible range, then, the transmission portion shift limiting means 86 does not alter the demanded gear position. Meanwhile, if the upper and lower limit comparison determining means 92 determines that the demanded gear position of the automatic transmission portion 20, determined with the demanded gear position determining means 88, is out of the permissible range, then, the transmission portion shift limiting means 86 alters the relevant demanded gear position to another different gear position.

For instance, if the upper and lower limit comparison determining means 92 determines that the demanded gear position of the automatic transmission portion 20 is less than the upper limit gear position and greater than the lower limit gear position, then, the transmission portion shift limiting means 86 outputs a command to the step-variable shifting control means 82 for executing the shifting control using the relevant demanded gear position of the automatic transmission portion 20, determined with the demanded gear position determining means 88, intact without changing the same.

Meanwhile, if the upper and lower limit comparison determining means 92 determines that the demanded gear position of the automatic transmission portion 20 is not less than the upper limit gear position, then, the transmission portion shift limiting means 86 outputs a command to the step-variable shifting control means 82 for changing the relevant demanded gear position of the automatic transmission portion 20, determined with the demanded gear position determining means 88, to the upper limit gear position while executing the shifting control using the upper limit gear position as a new demanded gear position.

Figure 11:
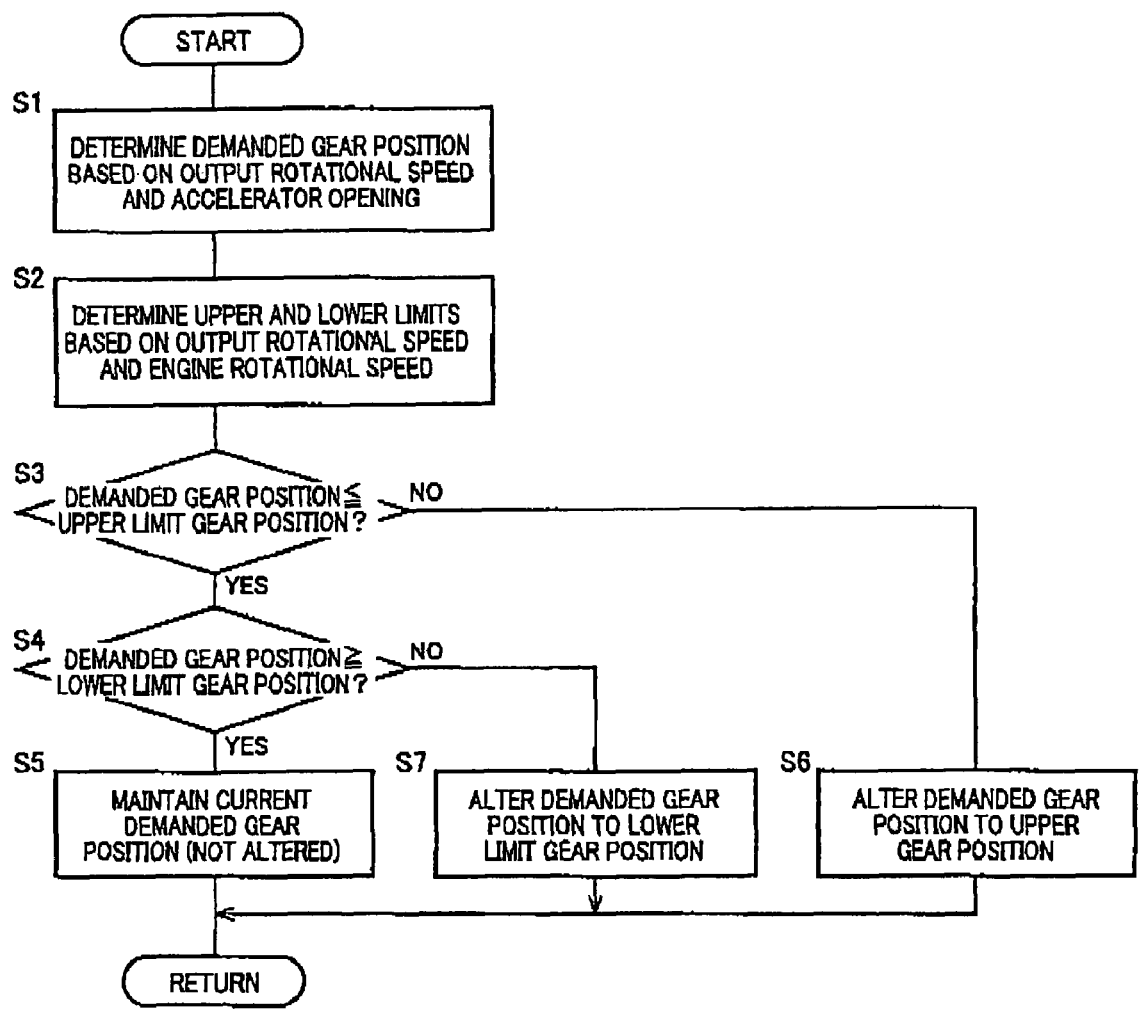
FIG. 11 is a flowchart illustrating a basic sequence of control operations to be executed with the electronic control unit shown in FIG. 4, i.e., a basic sequence of control operations to be executed under a circumstance where when a shift demand is present for the automatic transmission portion, the shifting of the automatic transmission portion is properly controlled to preclude a given element of a differential portion from rotating at a high speed.
Figure 12:
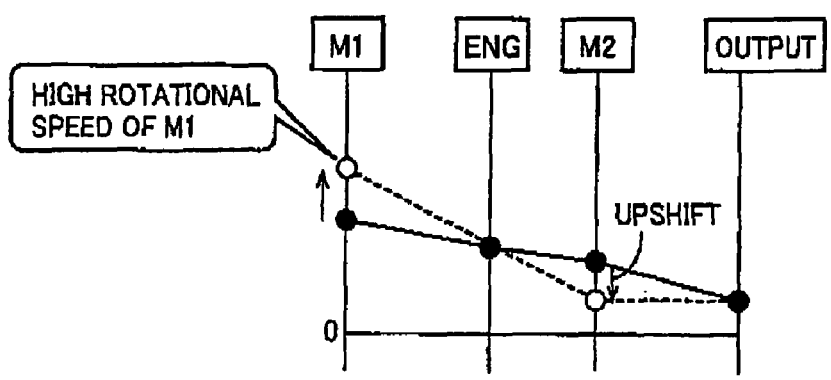
FIG. 12 is a well-known collinear view, showing rotational speeds of respective rotary elements forming the differential portion, on which the relationship associated with an output rotational speed of the transmission portion is plotted together with one example of variations in the rotational speeds of the respective rotary elements of the differential portion.

On the other hand, if the upper and lower limit comparison determining means 92 determines that the demanded gear position of the automatic transmission portion 20 is not greater than the lower limit gear position, then, the transmission portion shift limiting means 86 outputs a command to the step-variable shifting control means 82 for changing the relevant demanded gear position of the automatic transmission portion 20, determined with the demanded gear position determining means 88, to the lower limit gear position while executing the shifting control using the lower limit gear position as a new demanded gear position FIG. 11 is a flowchart illustrating a basic sequence of essential control operations to be executed by the electronic control unit 80, i.e., a basic sequence of control operations wherein when there is a shift demand to the automatic transmission portion 20, the automatic transmission portion 20 properly controls the shifting to prevent the given element of the differential portion 11 from rotating at a high speed. Such a basic sequence is repeatedly executed for an extremely short cycle time ranging from, for instance, approximately several milliseconds to several tens milliseconds.

In FIG. 11, first in step S1 corresponding to the demanded gear position determining means 88, a demanded gear position of the automatic transmission portion 20 is determined for the shift demand to the automatic transmission portion 20. For instance, under a circumstance where there are a shift demand for a cruising control to be executed, a shift demand resulting from the manual operation of the shift lever 52 to "M" position and a shift demand for the ascending/descending control to be executed, etc., a demanded gear position for the automatic transmission portion 20 is selected from among the demanded gear positions for the respective shift demands, involving the demanded gear positions determined based on the vehicle speed V and the accelerator opening Acc by referring to the shifting map shown in FIG. 8, and determined in accordance with a predetermined given priority level.

Next, in step S2 corresponding to the permissible range determining means 90, the operation is executed to determine whether or not the demanded gear position of the automatic transmission portion 20 lies in the permissible range, i.e., whether or not the (selectable) upper and lower limit gear position is permissible as the gear position of the automatic transmission 20. The upper and lower gear position is determined to be permissible as the gear position of the automatic transmission portion 20 based on the actual output shaft rotational speed $N_{OUT}$ and the actual engine speed $N_E$ by referring to, for instance, the upper and lower limit gear position map shown in FIG. 10.

Subsequently, in step S3 corresponding to the upper and lower limit comparison determining means 92, the operation is executed to determine whether or not the demanded gear position, determined in step S1, is less than the lower limit gear position.

If the determination in step S3 is made positive, then, in step S4 corresponding to the upper and lower limit comparison determining means 92, the operation is executed to determine whether or not the demanded gear position, determined in step S1, is greater than the lower limit gear position determined in step S2.

If the determination in step S4 is made positive, then, in step S5 corresponding to the transmission portion shift limiting means 86, the demanded gear position, determined in step S1, lies in the permissible range. Thus, the transmission portion shift limiting means 86 outputs a command to the step-variable shifting control means 82 so as not to change the demanded gear position for causing the automatic transmission portion 20 to execute the shifting control using the relevant gear position intact as the demanded gear position of the automatic transmission portion 20

Meanwhile, if the determination in step S3 is made negative, then, step S6 corresponding to the transmission portion shift limiting means 86 outputs a command to the step-variable shifting control means 82 so as to alter the demanded gear position, determined in step S1, to the upper limit gear position determined in step S2 while causing the automatic transmission portion 20 to execute the shifting control using such an upper limit gear position as a new demanded gear position.

On the contrary, if the determination in step S4 is made negative, then, step S7 corresponding to the transmission portion shift limiting means 86 outputs a command to the step-variable shifting control means 82 so as to alter the demanded gear position, determined in step S1, to the lower limit gear position determined in step S2 while causing the automatic transmission portion 20 to execute the shifting control using such a lower limit gear position as a new demanded gear position.

In the illustrated embodiment, as set forth above, the transmission portion shift limiting means 86 determines the permissible range of the gear position of the automatic transmission portion 20 in consideration of the rotational speed of the given element of the differential portion 11 into consideration for the shift demand to the automatic transmission portion 20, upon which the shifting of the automatic transmission portion 20 is limited based on such a permissible range. Upon receipt of the shift demand to the automatic transmission portion 20, the given element of the differential portion 11 can be prevented from rotating at a high speed. As a result, for instance, the first electric motor M1, the second electric motor M2 and the first planetary gear P1 or the like are prevented from rotating at high speeds, resulting in improved durability of the first electric motor M1, the second electric motor M2 and the first planetary gear P1 or the like.

In the illustrated embodiment, the transmission portion shift limiting means 86 (the permissible range determining means 90) determines the permissible range of the demanded gear positions for the automatic transmission portion 20 depending on the relationship between the output shaft rotational speed relevant value of the automatic transmission portion 20 and the engine speed $N_E$ such that no given element of the differential portion 11 rotates at a high speed. For instance, the upper and lower limit gear position selectable as the gear position of the automatic transmission portion 20 is determined. This prevents, for instance, the first electric motor M1, the second electric motor M2 and the first planetary gear P1 or the like from rotating at high speeds. Thus, the shifting of the automatic transmission portion 20 can be properly limited.

In the illustrated embodiment, the transmission portion shift limiting means 86 limits the shifting of the automatic transmission portion 20 by compelling the automatic transmission portion 20 to perform the shifting at a gear position different from the gear position demanded for the automatic transmission portion 20. Thus, when there is the shift demand to the automatic transmission portion 20, the given element of the differential portion 11 can be properly avoided from rotating at the high speed.

In the illustrated embodiment, the transmission portion shift limiting means 86 (the permissible range determining means 90) determines the upper and lower limit gear positions, selectable as the gear positions of the automatic transmission portion 20, are appropriately determined based on the vehicle condition represented by the output shaft rotational speed $N_{OUT}$ and the engine speed $N_E$ (the target engine speed $N_{E1}$).

In the illustrated embodiment, a normal shifting of the automatic transmission portion 20, when no shifting of the automatic transmission portion 20 is limited, is determined by the step-variable shifting control means 82 based on the vehicle speed V and the accelerator opening Acc (or the demanded output torque $T_{OUT}$ and the throttle valve opening $\theta_{TH}$ or the like) by referring to the shifting map. Therefore, if no shifting of the automatic transmission portion 20 is limited, an appropriate shift demand to the automatic transmission portion 20 is determined, thereby achieving a traveling of the vehicle.

While the present invention has been described above in detail with reference to the illustrated embodiments shown in the accompanying drawings, the present invention may be implemented in other modes.

In the illustrated embodiment set forth above, for instance, under a situation where the given element of the differential portion 11 is liable to rotate at the high speed with the automatic transmission portion 20 executing the demanded shifting intact, the shifting of the automatic transmission portion 20 is limited. This is achieved by compelling the automatic transmission portion 20 to alter the relevant demanded gear position to the gear position, lying in the permissible range of the demanded gear position of the automatic transmission portion 20, upon which the shifting is executed. However, the shifting of the automatic transmission portion 20 has no need to be necessarily limited. In such a case, the shifting of the automatic transmission portion 20 may be limited using other various methods so as to preclude the given element of the differential portion 11 from rotating at the high speed.

One example of a method of limiting the shifting of the automatic transmission portion 20 may include, for instance, a method of canceling (inhibiting) a shift demand to the automatic transmission portion 20. In such a case, the shifting may be cancelled at a timing when, for instance, the shifting of the automatic transmission portion 20 is demanded. In an alternative, with a view to stably executing a control like an operation to prevent hunting or the like, the shifting may be cancelled at a timing when a predetermined time interval has elapsed after the shifting of the automatic transmission portion 20 is demanded.

Another example of the method of limiting the shifting of the automatic transmission portion 20 may include, for instance, a method of causing the automatic transmission portion 20 to execute the shifting on demand in a delayed time until a certain condition is satisfied. In this case, examples of a condition for executing the delayed shifting may supposedly include a case where, for instance, the output shaft rotational speed $N_{OUT}$ and/or the engine speed $N_E$ vary to allow the demanded shifting of the automatic transmission portion 20 to fall in the permissible (allowable) range (condition) or another case wherein a certain time interval has elapsed in the presence of the delay in shifting. The certain time interval may be preliminarily and experimentally obtained in consideration of a shifting response or the like of the engine speed $N_E$.

In the illustrated embodiment, further, under a situation where the operation of the automatic transmission portion 20 for executing the shifting on demand intact results in a consequence of the given element of the differential portion 11 rotating at the high speed, the transmission portion shift limiting means 86 limits the shifting of the automatic transmission portion 20. However, the current gear position may be regarded as the demanded gear position for the automatic transmission portion 20 to execute the shifting on demand. Therefore, under a circumstance where holding the current gear position results in a consequence of causing the given element of the differential portion 11 to rotate at the high speed, the transmission portion shift limiting means 86 may limit the shifting of the automatic transmission portion 20 upon executing the shifting so as to forcibly alter the current gear position to a gear position that is permissible as the gear position of the automatic transmission portion 20. Such a circumstance appears when, for instance, the first electric motor M1, the second electric motor M2 and the first planetary gear P1 or the like are probable to rotate at the high speeds.

One example of the case in which holding the current gear position results in the consequence of causing the first electric motor M1 to rotate at the high speed in a positive phase may supposedly include, for instance, a situation under which the engine speed $N_E$ is relatively higher than the output shaft rotational speed $N_{OUT}$ and the first-electric-motor rotational speed $N_{M1}$ exceeds a given value. Another example of the case in which holding the current gear position results in the consequence of causing the first electric motor M1 to rotate at the high speed in negative phase may supposedly include, for instance, a situation under which the engine speed $N_E$ is relatively lower than the output shaft rotational speed $N_{OUT}$ and the first-electric-motor rotational speed $N_{M1}$ is less than the given value.

Another example of the case in which holding the current gear position results in the consequence of causing the second electric motor M2 to rotate at the high speed may supposedly include, for instance, a situation under which the output shaft rotational speed $N_{OUT}$ is relatively high and the second-electric-motor rotational speed $N_{M2}$ is greater than the given value.

Another example of the case in which holding the current gear position results in the consequence of causing the first planetary gear P1 to rotate at the high speed may supposedly include, for instance, a situation under which a difference in rotational speed between the output shaft rotational speed $N_{OUT}$ and the engine speed $N_E$ is relatively large and the first planetary gear P1 (or rotational speed difference $\Delta N_{P1}$) exceeds a given value.

In the illustrated embodiment set forth above, while the differential portion 11 (power distributing mechanism 16) is configured to function as the electrically controlled continuously variable transmission in which the speed ratio $\gamma 0$ is continuously varied from the minimal value $\gamma 0_{min}$ to the maximal value $\gamma 0_{max}$, the present invention may be applied even to a case wherein the speed ratio $\gamma 0$ of the differential portion 11 is not continuously varied but pretended to vary step-by-step with the use of a differential action.

In the illustrated embodiment set forth above, moreover, the differential portion 11 may be of the type that includes a differential action limiting device incorporated in the power distributing mechanism 16 for limiting a differential action to be operative as at least a forward 2nd-stage step-variable transmission.

With the power distribution mechanisms 16 of the illustrated embodiments, the first carrier CA1 is connected to the engine 8; the first sun gear S1 is connected to the first electric motor M1; and the first ring gear R1 is connected to the power transmitting member 18. However, the present invention is not necessarily limited to such connecting arrangement, and the engine 8, first electric motor M1 and power transmitting member 18 have no objection to be connected to either one of the three elements CA1, S1 and R1 of the first planetary gear set 24.

Although the illustrated embodiment has been described with reference to the engine 8 directly connected to the input shaft 14, these component parts may suffice to be operatively connected via, for instance, gears, belts or the like. No need may arise for the engine 8 and the input shaft 14 to be necessarily disposed on a common axis.

Further, while the illustrated embodiment has been described with reference to the first electric motor M1 and the second electric motor M2 wherein the first electric motor M1 is coaxially disposed with the drive apparatus input shaft 14 and connected to the first sun gear S1 upon which the second electric motor M2 is connected to the power transmitting member 18. However, no need arises for these component parts to be necessarily placed in such connecting arrangement. For example, the first electric motor M1 may be connected to the first sun gear S1 through gears, a belt or the like, and the second electric motor M2 may be connected to the power transmitting member 18.

In the illustrated embodiment, further, the hydraulically operated frictional coupling devices such as the first and second clutches C1, C2 may include magnetic type clutches such as powder (magnetic powder) clutches, electromagnetic clutches and meshing type dog clutches, and electromagnetic type and mechanical coupling devices. For instance, with the electromagnetic clutches being employed, the hydraulic control circuit 70 may not include a valve device for switching hydraulic passages and may be replaced with a switching device or electromagnetically operated switching device or the like that are operative to switch electrical command signal circuits for electromagnetic clutches.

In the illustrated embodiment, further, the automatic transmission portion 20, 72 is disposed in the power transmitting path between the power transmitting member 18 serving as the output member of the differential portion 11, that is the power distributing mechanism 16 and the drive wheels 38. However, the power transmitting path may incorporate a transmission portion (power transmission) of other types such as, for instance, a continuously variable transmission (CVT), acting as an automatic transmission of one kind, and an automatic transmission or the like including a constant-mesh type parallel shaft transmission, well known as a manual shift transmission, which is operative to automatically switch gear positions using select cylinders and shift cylinders. The present invention may be implemented even in such a way.

While the illustrated embodiment has been described above with reference to the automatic transmission portion 20 that is connected to the differential portion 11 in series via the power transmitting member 18, a countershaft may be provided in parallel to the input shaft 14 to allow the automatic transmission portion 20 to be coaxially disposed on an axis of the countershaft. In this case, the differential portion 11 and the automatic transmission portion 20 may be connected to each other in power transmitting capability via a set of transmitting members structured of, for instance, a counter-gear pair acting as the power transmitting member 18, a sprocket and a chain.

Further, the power distributing mechanism 16 of the illustrated embodiment may include, for instance, a differential gear set in which a pinion, rotatably driven with the engine, and a pair of bevel gears, held in meshing engagement with the pinion, are operatively connected to the first electric motor M1 and the power transmitting member 18 (second electric motor M2).

The power distributing mechanism 16 of the illustrated embodiment has been described above as including one set of planetary gear units, the power distributing mechanism 16 may include two or more sets of planetary gear units that are arranged to function as a transmission having three or more speed positions under a non-differential state (fixed shifting state). In addition, the planetary gear unit is not limited to the single-pinion type, but may be of a double-pinion type.

While the shift operating device 50 of the illustrated embodiment has been described with reference to the shift lever 52 operative to select a plurality of kinds of shift positions $P_{SH}$, the shift lever 52 may be replaced by other type of switches or devices. These may include, for instance: a select switch such as a press-button type switch and a slide-type switch available to select one of a plurality of shift positions $P_{SH}$; a device operative to switch a plurality of shift positions $P_{SH}$ in response not to the manipulation initiated by the hand but to a driver's voice; and a device operative to switch a plurality of shift positions $P_{SH}$ in response to the manipulation initiated by the foot.

While the illustrated embodiment has been described with reference to the shifting range that is established upon manipulating the shift lever 52 to the "M" position, the gear positions may be set, i.e., maximal speed gear positions for respective shifting ranges may be set as the gear positions. In this case, the automatic transmission portion 20 operates so as to allow the gear positions to be switched for executing the shifting action. For example, as the shift lever 52 is manually operated to an up-shift position "+" or a down-shift position "−" in the "M" position, the automatic transmission portion 20 operates so as to allow any of the 1st-speed gear position to the 4th-speed gear position to be set depending on the manipulation of the shift lever 52.

The foregoing merely illustrates the embodiments for illustrating the principles of the present invention. It will be appreciated by those skilled in the art that various modifications and alternatives to those details could be developed in the light of the overall teachings of the disclosure.

What is claimed is:

1. A control device for a vehicular drive system having a differential portion including a differential mechanism having a first element connected to an engine, a second element connected to a first electric motor and a third element connected to a power transmitting member for distributing an output of the engine to the first electric motor and the power transmitting member, and a transmission portion disposed in a power transmitting path between the power transmitting member and drive wheels, the control device characterized by:

a transmission portion shift limiting means that determines a permissible range of speed ratio of the transmission portion for a shift demand to the transmission portion in consideration of a rotational speed of a given element of the differential portion or a relative rotation speed between given elements of the differential portion so as to prevent the rotational speed of the given element of the differential portion or the relative rotation speed between the given elements of the differential portion from reaching a high rotation, and executes a limited shifting of the transmission portion if the speed ratio of a gear position demanded in the shift demand exceeds the permissible range.

2. The control device for a vehicular drive system according to claim 1, wherein the transmission portion shift limiting means determines the permissible range so as to prevent the rotational speed of the given element from reaching the high rotation by referring to a relationship between an output rotational-speed relevant value of the transmission portion and an engine speed.

3. The control device for a vehicular drive system according to claim 1, wherein the transmission portion shift limiting means determines the permissible range so as to prevent the relative rotation speed between the given elements from reaching the high rotation by referring to a relationship between an output rotational-speed relevant value of the transmission portion and an engine speed.

4. The control device for a vehicular drive system according to claim 2, wherein the transmission portion shift limiting means determines the permissible range so as to prevent the relative rotation speed between the given elements from reaching the high rotation by referring to a relationship between an output rotational-speed relevant value of the transmission portion and an engine speed.

5. The control device for a vehicular drive system according to claim 1, further comprising a second electric motor connected to the power transmitting member;
wherein the transmission portion shift limiting means determines the permissible range so as to prevent a high rotation in a relative rotation speed between an element connected to the second electric motor, and an element held in engagement with the connected element.

6. The control device for a vehicular drive system according to claim 2, further comprising a second electric motor connected to the power transmitting member;
wherein the transmission portion shift limiting means determines the permissible range so as to prevent the high rotation in a relative rotation speed between an element connected to the second electric motor, and an element held in engagement with the connected element.

7. The control device for a vehicular drive system according to claim 3, further comprising a second electric motor connected to the power transmitting member;
wherein the transmission portion shift limiting means determines the permissible range so as to prevent the high rotation in a relative rotation speed between an element connected to the second electric motor, and an element held in engagement with the connected element.

8. The control device for a vehicular drive system according to claim 4, further comprising a second electric motor connected to the power transmitting member;
wherein the transmission portion shift limiting means determines the permissible range so as to prevent the high rotation in a relative rotation speed between an element connected to the second electric motor, and an element held in engagement with the connected element.

9. The control device for a vehicular drive system according to claim 1, wherein the transmission portion shift limiting means limits the shifting of the transmission portion by inhibiting the shift demanded to the transmission portion.

10. The control device for a vehicular drive system according to claim 1, wherein the transmission portion shift limiting means limits the shifting of the transmission portion by delaying the shift demanded to the transmission portion.

11. The control device for a vehicular drive system according to claim 1, wherein the transmission portion shift limiting means limits the shifting of the transmission portion by effectuating a shift different from the shift demanded to the transmission portion.

12. The control device for a vehicular drive system according to claim 1, wherein the transmission portion shift limiting means limits the shifting of the transmission portion by forcibly effectuating a shift from a current state of the transmission portion.

13. The control device for a vehicular drive system according to claim 1, wherein the transmission portion shift limiting means determines the permissible range based on the output rotational-speed relevant value of the transmission portion and an actual engine speed.

14. The control device for a vehicular drive system according to claim 1, wherein the transmission portion shift limiting means determines the permissible range based on the output rotational-speed relevant value of the transmission portion and a target engine speed.

15. The control device for a vehicular drive system according to claim 1, wherein a normal shift in the transmission portion, when no shift of the transmission portion is limited by the transmission portion shift limiting means, is determined based on the output rotational-speed relevant value of the transmission portion and a driver's request.

16. The control device for a vehicular drive system according to claim 1, wherein the differential portion is operative as a continuously variable transmission with an operational state of the first electric motor being controlled.

* * * * *